United States Patent
Zhang et al.

(10) Patent No.: US 12,131,213 B2
(45) Date of Patent: Oct. 29, 2024

(54) EMULATED CARD SWITCHING METHOD, ELECTRONIC DEVICE, AND COMMUNICATION SYSTEM

(71) Applicant: Huawei Technologies Co., Ltd., Shenzhen (CN)

(72) Inventors: Xiuping Zhang, Dongguan (CN); Haitao Yi, Shenzhen (CN); Guohui Ji, Dongguan (CN); Shuxin Zhu, Dongguan (CN); Yong Xiong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/249,921

(22) PCT Filed: Oct. 18, 2021

(86) PCT No.: PCT/CN2021/124450
§ 371 (c)(1),
(2) Date: Apr. 20, 2023

(87) PCT Pub. No.: WO2022/083551
PCT Pub. Date: Apr. 28, 2022

(65) Prior Publication Data
US 2023/0385565 A1    Nov. 30, 2023

(30) Foreign Application Priority Data
Oct. 21, 2020  (CN) .......................... 202011133300.9

(51) Int. Cl.
*G06K 7/10*    (2006.01)

(52) U.S. Cl.
CPC .............................. *G06K 7/10297* (2013.01)

(58) Field of Classification Search
CPC ... G06K 7/10297; G06K 7/10; G06K 7/10237
(Continued)

(56) References Cited

U.S. PATENT DOCUMENTS

2013/0331029 A1* 12/2013 Tang ........................ H04W 4/60
    455/41.1
2020/0104826 A1* 4/2020 Rule ...................... G06Q 20/36
(Continued)

*Primary Examiner* — Ahshik Kim
(74) *Attorney, Agent, or Firm* — Slater Matsil, LLP

(57) ABSTRACT

An emulated card switching method, electronic device, and communication system are provided. The method includes sending first information to an near field communication (NFC) card reader which determines a first protocol based on the first information and a protocol supported by the NFC card reader, and performs a service process of the first protocol with the electronic device, if no identification information is obtained, modifying protocol information of a first emulated card from the first information to second information, sending the second information to the NFC card reader which obtains the second information from the electronic device, determines a second protocol based on the second information and the protocol supported by the NFC card reader, and performs a service process of the second protocol with the electronic device, and if identification information is obtained, switching the first emulated card to a second emulated card corresponding to the identification information.

19 Claims, 26 Drawing Sheets

(58) Field of Classification Search
USPC .......................................................... 235/451
See application file for complete search history.

(56) References Cited

U.S. PATENT DOCUMENTS

2021/0067201 A1* 3/2021 Wang .................... G06Q 20/227
2022/0180351 A1* 6/2022 Zhou .................. G06Q 20/3278

* cited by examiner

EMULATED CARD SWITCHING METHOD, ELECTRONIC DEVICE, AND COMMUNICATION SYSTEM

CROSS-REFERENCE TO RELATED APPLICATIONS

This application is a national stage of International Application No. PCT/CN2021/124450, filed on Oct. 18, 2021, which claims priority to Chinese Patent Application No. 202011133300.9, filed on Oct. 21, 2020. Both of the aforementioned applications are hereby incorporated by reference in their entireties.

TECHNICAL FIELD

This application relates to the field of near field communication (Near Field Communication, NFC for short), and specifically, to an emulated card switching method, an electronic device, and a communication system.

BACKGROUND

NFC is a short-distance high-frequency wireless communication technology, and supports non-contact point-to-point data transmission between NFC electronic devices within a distance of 10 cm. The NFC technology has become a related international standard and is widely applied.

Currently, an electronic device cannot automatically switch an access card to a bus card based on an application identifier (Application Identifier, AID for short), and a user needs to manually switch between cards and perform a card swiping operation again after card switching. This reduces card swiping efficiency.

SUMMARY

In view of this, this application provides an emulated card switching method, a device, and a communication system, to improve card swiping efficiency.

According to a first aspect, an embodiment of this application provides a communication system, including a near field communication NFC card reader and an electronic device having an NFC function. A first emulated card and a second emulated card are disposed on the electronic device, the first emulated card is an activated card, a card support protocol of the first emulated card is a first protocol, and a card support protocol of the second emulated card is a second protocol.

The NFC card reader is configured to obtain first information of the first emulated card from the electronic device, determine the first protocol based on the first information and a protocol supported by the NFC card reader, and perform a service process of the first protocol with the electronic device.

The electronic device is configured to: if no identification information is obtained when the service process of the first protocol is performed, modify protocol information of the first emulated card from the first information to second information.

The NFC card reader is further configured to obtain the second information from the electronic device, determine the second protocol based on a card support protocol corresponding to the second information and the protocol supported by the NFC card reader, and perform a service process of the second protocol with the electronic device.

The electronic device is further configured to: if identification information is obtained when the service process of the second protocol is performed, switch, based on the identification information, the first emulated card to the second emulated card corresponding to the identification information.

In a possible implementation, the first protocol includes the ISO14443-3 protocol, and the second protocol includes the ISO14443-3 protocol and the ISO14443-4 protocol.

In a possible implementation, the electronic device is further configured to display, in response to a first operation entered by a user, the second emulated card as a default card.

In a possible implementation, the first emulated card is an access card, and the second emulated card is a bus card.

According to a second aspect, an embodiment of this application provides an emulated card switching method, applied to an electronic device. A first emulated card and a second emulated card are disposed on the electronic device, the first emulated card is an activated card, a card support protocol of the first emulated card is a first protocol, and a card support protocol of the second emulated card is a second protocol. The method includes: sending first information of the first emulated card to an NFC card reader, so that the NFC card reader determines the first protocol based on the first information and a protocol supported by the NFC card reader, and performs a service process of the first protocol with the electronic device; if no identification information is obtained when the service process of the first protocol is performed with the NFC card reader, modifying protocol information of the first emulated card from the first information to second information; sending the second information to the NFC card reader, so that the NFC card reader obtains the second information from the electronic device, determines the second protocol based on the second information and the protocol supported by the NFC card reader, and performs a service process of the second protocol with the electronic device; and if identification information is obtained when the service process of the second protocol is performed with the NFC card reader, switching, based on the identification information, the first emulated card to the second emulated card corresponding to the identification information.

In a possible implementation, if the first protocol includes a protocol for which no identification information is selected, performing the service process of the first protocol includes: performing a service process of the protocol for which no identification information is selected.

In a possible implementation, if the second protocol includes a protocol for which no identification information is selected and a protocol for which identification information is selected, performing the service process of the second protocol includes: performing a service process of the protocol for which no identification information is selected and performing a service process of the protocol for which identification information is selected.

In a possible implementation, the first protocol includes the ISO14443-3 protocol, and the second protocol includes the ISO14443-3 protocol and the ISO14443-4 protocol.

In a possible implementation, the identification information includes an application identifier AID.

In a possible implementation, the protocol information of the first emulated card is selection acknowledgement SAK.

In a possible implementation, the method further includes: in response to a first operation entered by a user, displaying the second emulated card as a default card.

In a possible implementation, the method further includes: displaying prompt information, where the prompt information is used to prompt the user that card swiping succeeds or fails.

In a possible implementation, the first emulated card is an access card, and the second emulated card is a bus card.

According to a third aspect, an embodiment of this application provides an electronic device, where the electronic device includes a processor and an NFC controller. A first emulated card and a second emulated card are disposed on the electronic device, the first emulated card is an activated card, a card support protocol of the first emulated card is a first protocol, and a card support protocol of the second emulated card is a second protocol.

The NFC controller is configured to send first information of the first emulated card to an NFC card reader, so that the NFC card reader determines the first protocol based on the first information and a protocol supported by the NFC card reader, and performs a service process of the first protocol with the electronic device.

The NFC controller is further configured to send, to the processor, first service information generated when the NFC card reader performs the service process of the first protocol with the electronic device.

The processor is configured to exchange information with the NFC controller if the first service information does not include identification information, so that the NFC controller modifies protocol information of the first emulated card from the first information to second information.

The NFC controller is further configured to send second information to the NFC card reader, so that the NFC card reader obtains the second information from the electronic device, determines the second protocol based on the second information and the protocol supported by the NFC card reader, and performs a service process of the second protocol with the electronic device.

The NFC controller is further configured to send, to the processor, second service information generated when the NFC card reader performs the service process of the second protocol with the electronic device.

The processor is further configured to trigger the second NFC controller if the second service information includes the identification information.

The NFC controller is further configured to switch, based on the identification information, the first emulated card to the second emulated card corresponding to the identification information.

According to a fourth aspect, an embodiment of this application provides an electronic device, including: a display, one or more processors, a memory, and one or more computer programs, where the one or more computer programs are stored in the memory, the one or more computer programs include instructions, and when the instructions are executed by the device, the device is enabled to perform the following steps: a display, one or more processors, a memory, and one or more computer programs, where the one or more computer programs are stored in the memory, the one or more computer programs include instructions, and when the instructions are executed by the device, the device is enabled to perform the following steps: sending first information of the first emulated card to an NFC card reader, so that the NFC card reader determines the first protocol based on the first information and a protocol supported by the NFC card reader, and performs a service process of the first protocol with the electronic device; if no identification information is obtained when the service process of the first protocol is performed with the NFC card reader, modifying protocol information of the first emulated card from the first information to second information; sending the second information to the NFC card reader, so that the NFC card reader obtains the second information from the electronic device, determines the second protocol based on the second information and the protocol supported by the NFC card reader, and performs a service process of the second protocol with the electronic device; and if identification information is obtained when the service process of the second protocol is performed with the NFC card reader, switching, based on the identification information, the first emulated card to the second emulated card corresponding to the identification information.

In a possible implementation, when the instructions are executed by the device, the device is enabled to specifically perform the following step: if the first protocol includes a protocol for which no identification information is selected, performing a service process of the protocol for which no identification information is selected.

In a possible implementation, when the instructions are executed by the device, the device is enabled to specifically perform the following step: if the second protocol includes a protocol for which no identification information is selected and a protocol for which identification information is selected, performing a service process of the protocol for which no identification information is selected and a service process of the protocol for which the identification information is selected.

In a possible implementation, the first protocol includes the ISO14443-3 protocol, and the second protocol includes the ISO14443-3 protocol and the ISO14443-4 protocol.

In a possible implementation, the identification information includes an application identifier AID.

In a possible implementation, the protocol information of the first emulated card includes selection acknowledgement SAK.

In a possible implementation, when the instructions are executed by the device, the device is enabled to perform the following step: in response to a first operation entered by a user, displaying the second emulated card as a default card.

In a possible implementation, when the instructions are executed by the device, the device is enabled to perform the following step: displaying prompt information, where the prompt information is used to prompt the user that card swiping succeeds or fails.

In a possible implementation, the first emulated card is an access card, and the second emulated card is a bus card.

According to a fifth aspect, an embodiment of this application provides a computer-readable storage medium. The computer-readable storage medium includes a stored program, and when the program is run, a device in which the computer-readable storage medium is located is controlled to perform the emulated card switching method in any one of the second aspect or the possible implementations of the second aspect.

According to a sixth aspect, an embodiment of this application provides a computer program product including instructions. When the computer program product runs on a computer or any one of at least one processor, the computer is enabled to perform the emulated card switching method in any one of the second aspect or the possible implementations of the second aspect.

In the technical solutions provided in this embodiment of this application, the electronic device adjusts the protocol information of the activated card (the first emulated card), so that the NFC card reader can perform a service process of a specified protocol with the electronic device based on adjusted protocol information and the protocol supported by the NFC card reader. When performing the service process of the specified protocol, the electronic device obtains the identification information, and automatically switches, based on the identification information, the first emulated card to the second emulated card corresponding to the identification information. In this way, automatic card switching is implemented, and card swiping efficiency is improved.

BRIEF DESCRIPTION OF THE DRAWINGS

To describe technical solutions in embodiments of this application more clearly, the following briefly describes the accompanying drawings for embodiments. It is clear that the accompanying drawings in the following descriptions show merely some embodiments of this application, and a person of ordinary skill in the art may derive other drawings from these accompanying drawings without creative efforts.

Figure 15:
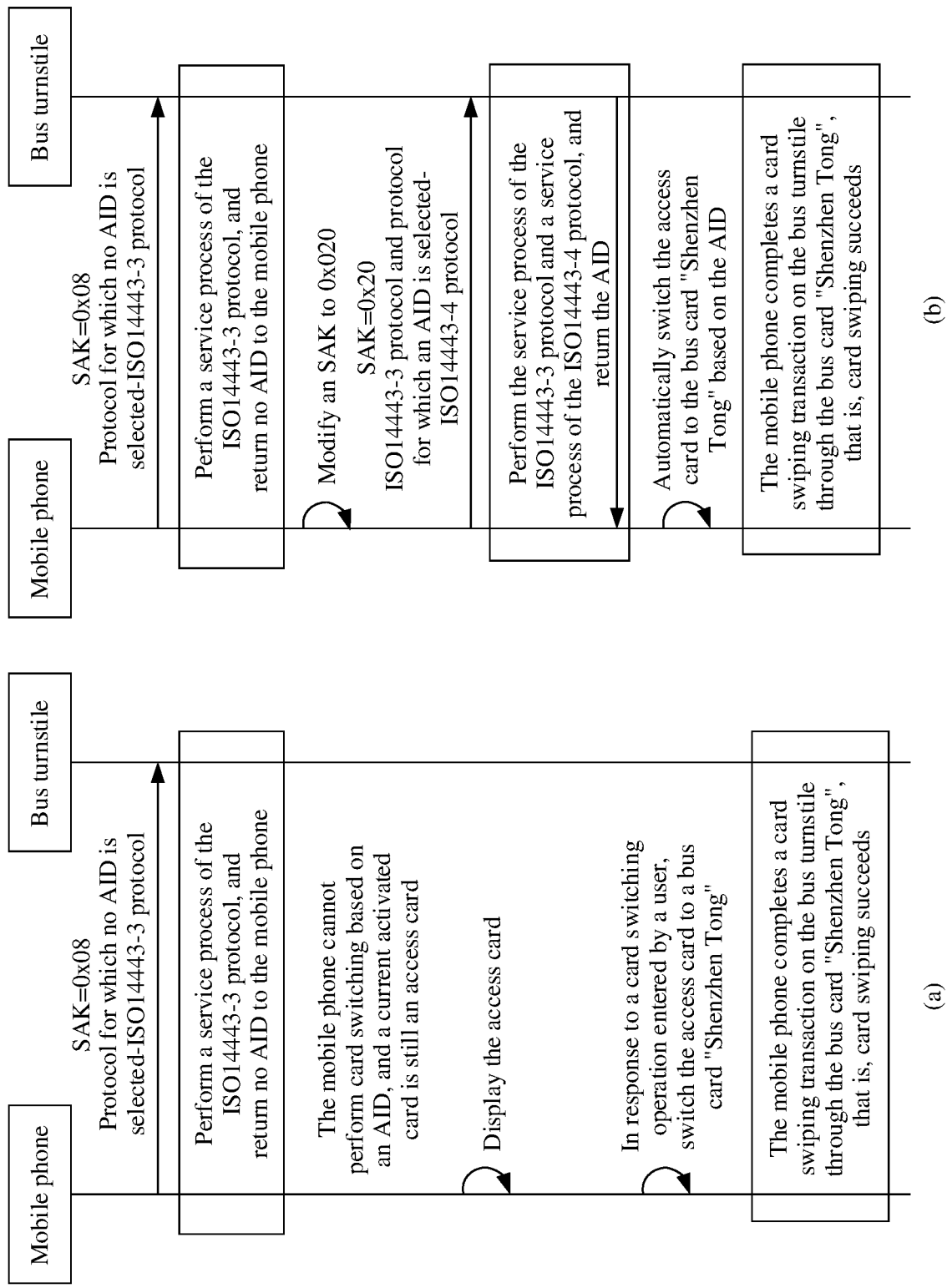
Figure 16:
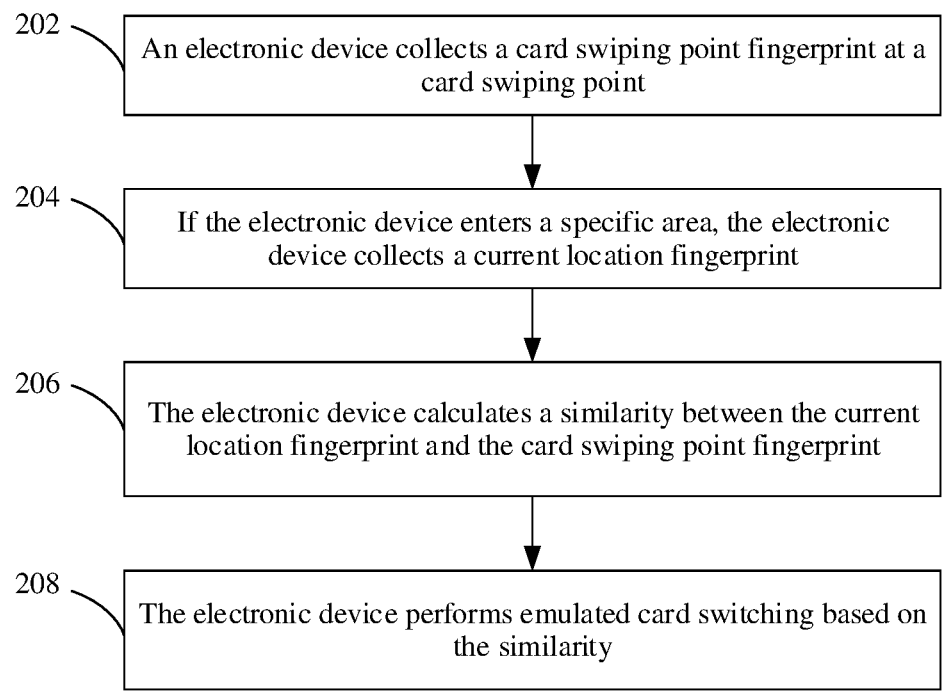

(a) in FIG. 15 is a schematic diagram of a manual card switching solution in a related technology;

(b) in FIG. 15 is a schematic diagram of an automatic card switching solution according to an embodiment of this application; and FIG. 16 is a flowchart of an emulated card switching method according to some other embodiments of this application.

DETAILED DESCRIPTION OF ILLUSTRATIVE EMBODIMENTS

To better understand the technical solutions of this application, the following describes embodiments of this application in detail with reference to the accompanying drawings.

It should be clear that the described embodiments are merely some rather than all of embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
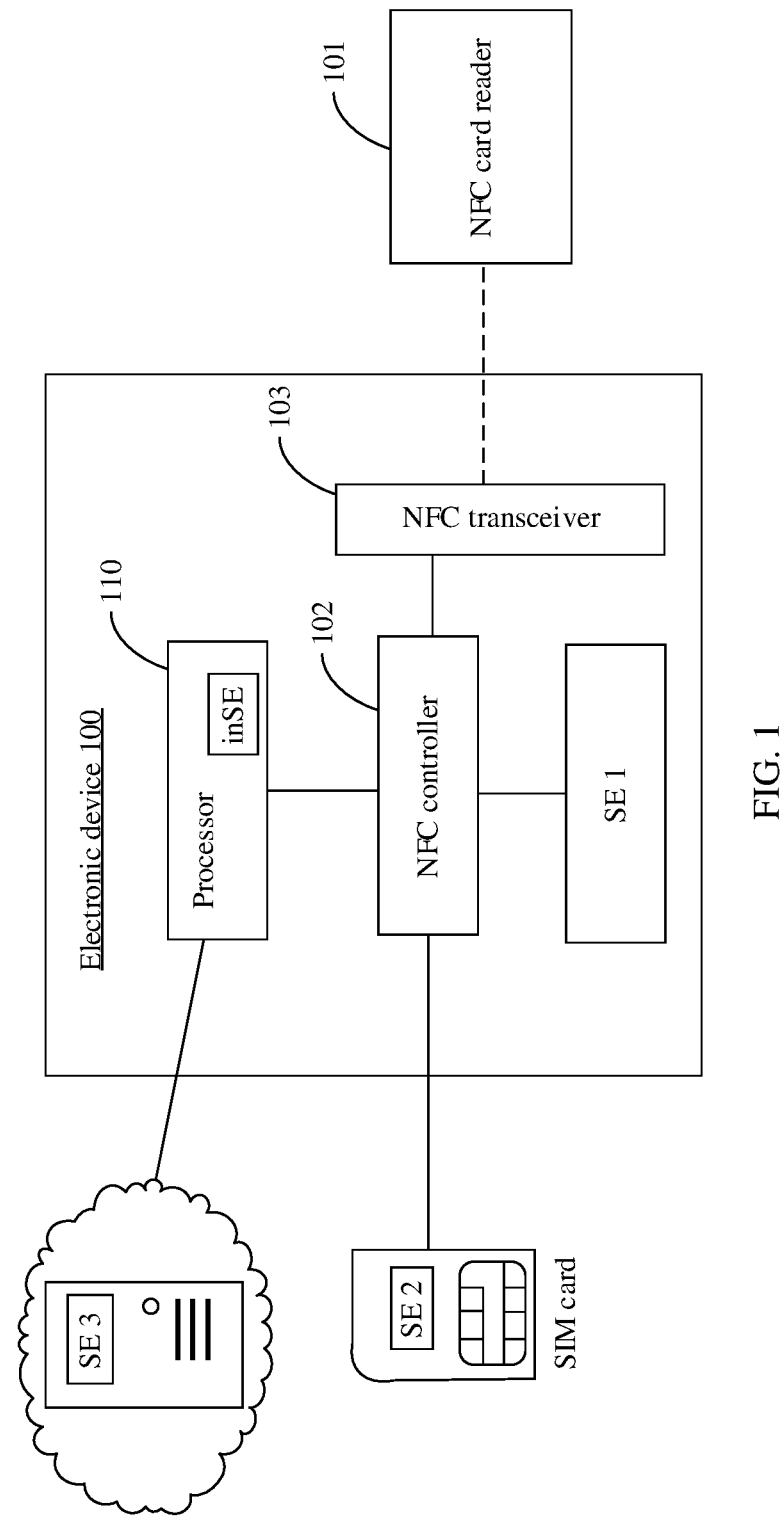
FIG. 1 is a schematic diagram of a structure of an NFC communication system according to some embodiments.

NFC is a short-distance high-frequency wireless communication technology, and supports non-contact point-to-point data transmission between NFC electronic devices within a distance of 10 cm. A transmission speed of the NFC technology includes 106 kbit/s, 212 kbit/s, or 424 kbit/s. At present, the NFC technology has become a related international standard and is widely applied. For example, as shown in FIG. 1, an NFC communication system is provided. The NFC communication system may include an electronic device 100 and an NFC card reader 101. In this embodiment of this application, the electronic device 100 is an electronic device having an NFC function, and an electronic device having an NFC function may also be referred to as an NFC electronic device. The electronic device 100 and the NFC card reader 101 may implement proximity-based (proximity-based) non-contact communication. The electronic device 100 and the NFC card reader 101 may perform NFC communication at a low data rate and may comply with any appropriate standard, such as an ISo/IEC 7816, ISo/IEC 18092, ECMA-340, ISo/IEC 21481, ECMA-352, ISO 1444, or ISO 15693 protocol. The electronic device 100 and the NFC card reader 101 may also perform NFC communication at a high data rate and may comply with any appropriate standard, such as a Transfer Jet™ protocol.

In some embodiments, the electronic device 100 includes but is not limited to a device that carries an iOS®, Android®, Microsoft®, or another operating system. The electronic device 100 includes but is not limited to a mobile phone, a tablet computer, a desktop computer, a laptop computer, a handheld computer, a wearable device, a head mounted display, a reader device, a portable music player, a portable game console, a notebook computer, an ultra-mobile personal computer (ultra-mobile personal computer, UMPC for short), a netbook, a cellular phone, a personal digital assistant (personal digital assistant, PDA for short), and augmented reality (augmented reality, AR for short) or virtual reality (virtual reality, VR for short) device.

In some embodiments, the NFC card reader 101 includes but is not limited to an access card reader, a card reader configured on a bus turnstile (a bus POS terminal), a card reader configured on a subway turnstile, a card reader configured on a door lock, an NFC payment terminal configured at a transaction place (for example, a bank card POS terminal), a card reader configured on a car door handle, or a card reader configured on a treadmill.

Figure 2:
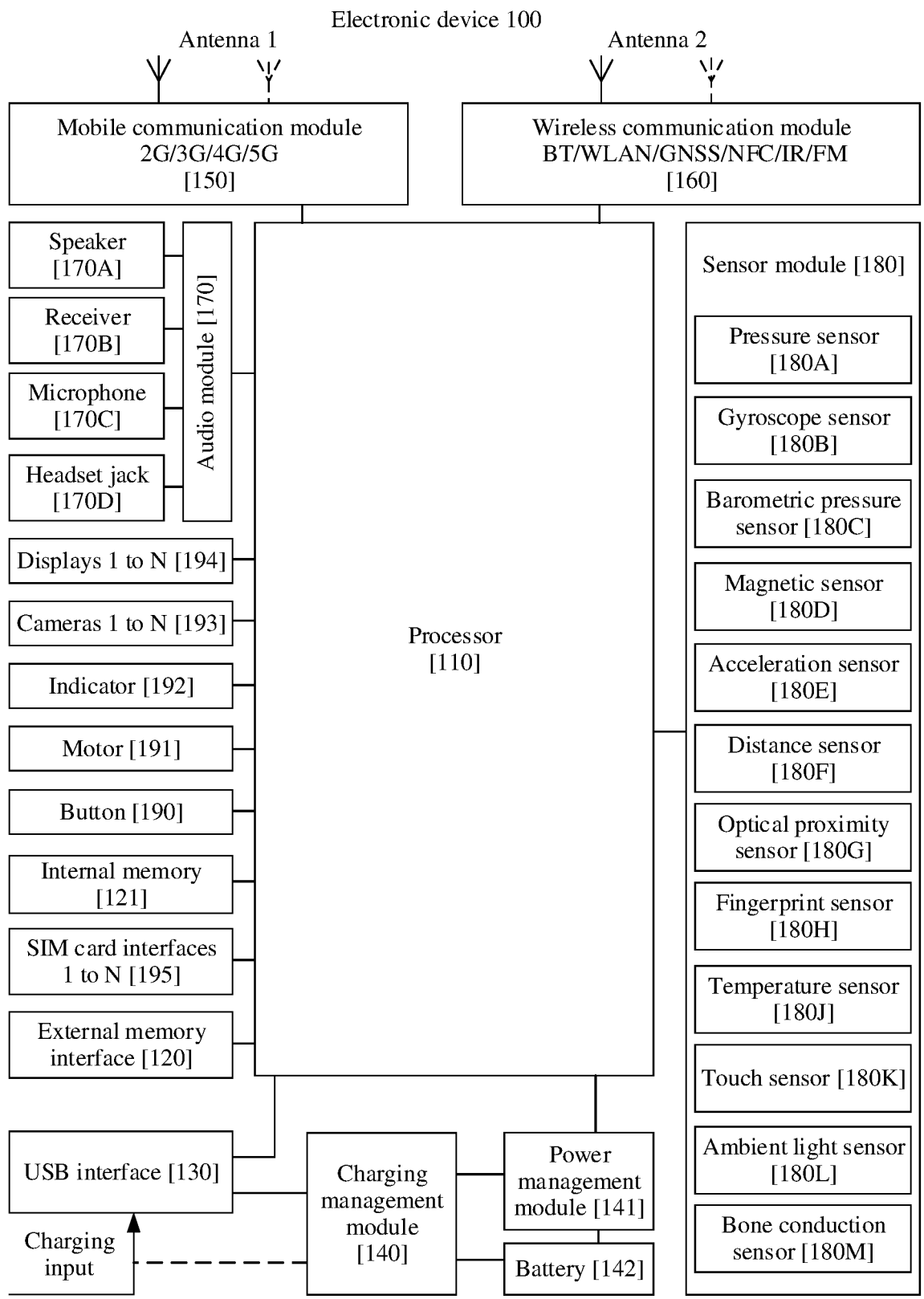
FIG. 2 is a schematic diagram of a hardware structure of an electronic device according to some embodiments.

It should be noted that FIG. 1 shows only some components inside the electronic device 100. For other components in the electronic device 100, refer to FIG. 2. For example, as shown in FIG. 2, a hardware diagram of a structure of the electronic device 100 in FIG. 1 is provided. As shown in FIG. 2, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110. The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute instructions to generate or change display information. The electronic device 101 may implement a shooting function by using the ISP, one or more cameras 193, the video codec, the GPU, one or more displays 194, the application processor, and the like.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

In some embodiments, as shown in FIG. 1, the electronic device 100 further includes an NFC controller (NFC Controller, NFCC for short) 102 and an NFC transceiver 103. The NFC controller 102 is connected to the processor 110 and the NFC transceiver 103.

The NFC controller 102 is mainly configured to perform modulation and demodulation on a non-contact communication signal, and interact with the processor 110. In some other embodiments, the NFC controller 102 may alternatively be an NFC chip that implements the foregoing functions.

The NFC transceiver 103 is mainly configured to send and receive a radio frequency signal, and may include an electromagnetic compatibility (electromagnetic compatibility, EMC for short) filter circuit, a matching circuit, a receiving circuit, an NFC antenna, and the like. The NFC antenna may be a ring antenna, and is configured to implement a neighboring-based non-contact communication capability. In some other embodiments, the NFC antenna may also be the antenna 2 in FIG. 2.

In some embodiments, the NFC communication system further includes a secure element (safe element, SE for short). The NFC controller 102 implements the method according to embodiments of this application by coupling different secure elements. The secure element may exist in a plurality of forms. For example, a secure element SE 1 may be integrated into a printed circuit board (printed circuit board, PBC for short) of the electronic device 100. In this case, the secure element SE 1 may be independent of other software and hardware of the electronic device 100, and support an encryption protocol to enhance access control, and only an authenticated application can access the secure element SE 1 and initiate an NFC service. This ensures security of the NFC service. For example, a secure element SE 2 may be further integrated into an integrated circuit card (universal integrated circuit card, UICC). For example, the secure element SE 2 is integrated into a SIM card (an eSIM card), and the SIM card is manufactured and sold by a telecommunications operator. In this way, costs of a manufacturer of the electronic device are reduced. For example, a secure element inSE may be further coupled to the processor 110. For example, a secure element SE 3 may be configured on a server side. For example, a secure element may be further integrated into a system on chip (System on Chip, SoC for short). In some other embodiments, the electronic device 101 may include one or more secure elements, and the secure elements may run independently of each other.

A main function of the secure element is secure storage of an application and data, and to provide a secure operation service externally. The secure element may further communicate with another electronic device through the NFC controller 102, to implement security of data storage and a communication process. It may be understood that the secure element may be an anti-tampering component configured to provide security and confidentiality and support various application environments. In addition, the secure element may further include one or more applications executed in an environment of the secure element (for example, in an operating system of the secure element and/or in a Java running environment that runs on the secure element). The one or more applications may include one or more applications (for example, Huawei Wallet®, Alipay®, and PayPal®) that are stored in the internal memory 121 and that are used for NFC payment. The secure element further supports security isolation of data of applications. That is, for security, the secure element may not allow access between different applications. The secure element further provides symmetric and asymmetric encryption algorithms and certificate capabilities required by various mobile payment services, provides a program interface for secure transaction application access, and supports bidirectional communication with the NFC controller 102 or the processor 110.

Figure 3:
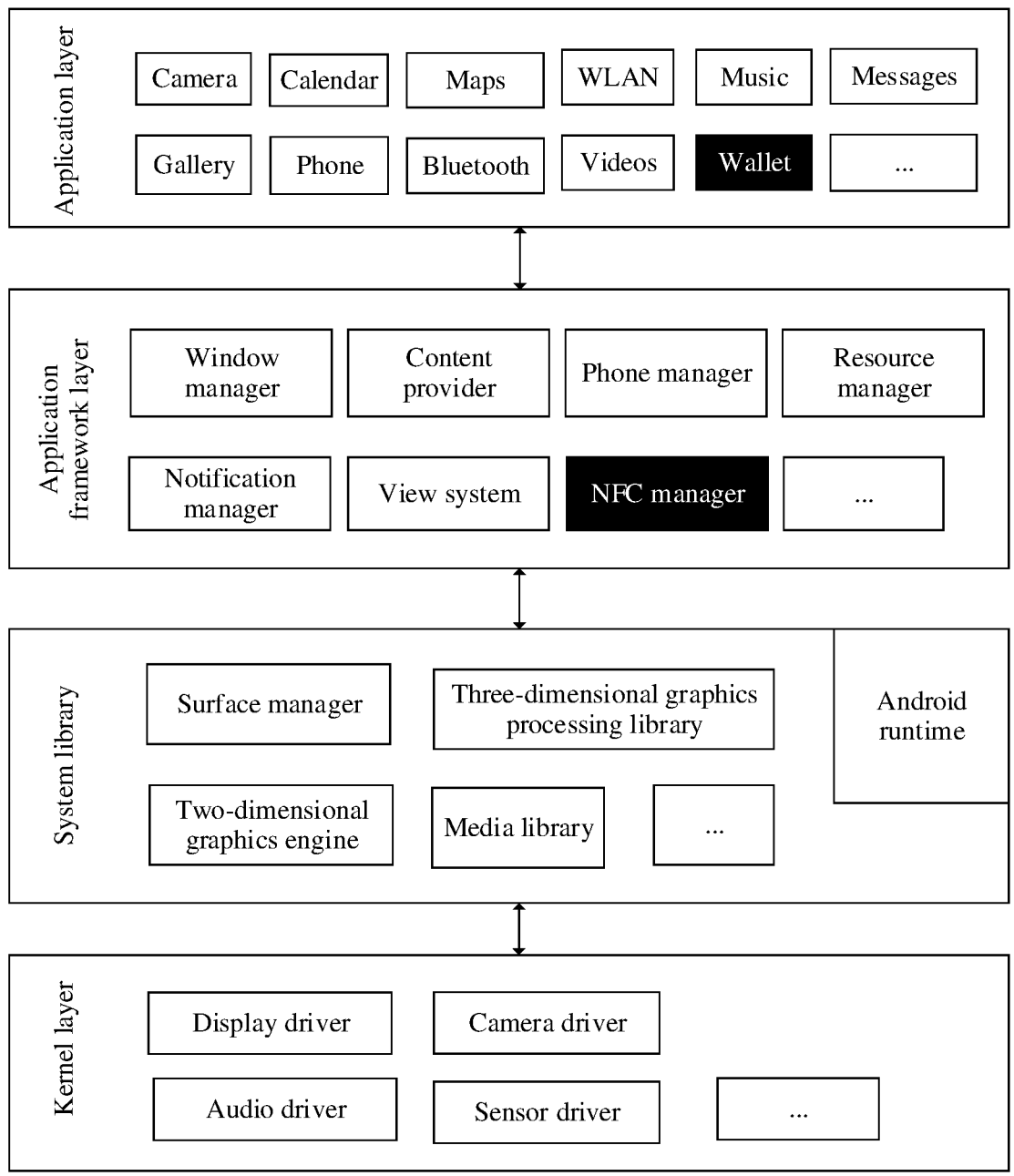
FIG. 3 is a block diagram of a hardware structure of an electronic device according to some embodiments.

For example, FIG. 3 is a block diagram of a software structure of the electronic device 100. In a hierarchical architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 3, the application packages may include applications such as Camera, Gallery, Calendar, Phone, Maps, WLAN, Bluetooth, Music, Video, Messages, and Wallet. The wallet may include an NFC wallet, and is a native application installed in the electronic device 100 before the electronic device 100 (for example, a mobile phone) is delivered from a factory. The NFC wallet may implement an NFC-related function. For example, the NFC wallet may be, for example, Huawei Pay®, Samsung Pay®, or UnionPay Wallet®. In addition, the NFC wallet may be managed based on a service provider of the application, for example, updating the application or adding a bank card.

The application framework layer provides an application programming interface (application programming interface, API) and a programming framework for an application at the application layer. The application framework layer includes some predefined functions. As shown in FIG. 3, the application framework layer may include a window manager, a content provider, a view system, a phone manager, a resource manager, a notification manager, an NFC manager (NFC Manager), and the like. The NFC manager may be configured to manage all NFC adapters indicated in the electronic device 100. For example, a function NfcAdapter may be used to indicate NFC communication-related components (such as the NFC controller 102, the NFC transceiver 103, and the secure element) of the electronic device 100. NfcAdapter is an entry for an application to access an NFC function, and is mainly used to obtain an instance of an NFC adapter. A getDefaultAapater( ) function may be used to obtain an adapter supported by the system. In addition, the NFC manager is further configured to process data from an NFC-related application, for example, an NFC wallet; or the NFC manager forwards data received from the NFC card reader 101 to an NFC-related application, for example, an NFC wallet.

The system library may include a plurality of functional modules, for example, a surface manager (surface manager), a media library (Media Library), a three-dimensional graphics processing library (for example, OpenGL ES), and a three-dimensional graphics engine (for example, SGL).

The Android runtime includes a kernel library and a virtual machine. The Android runtime is responsible for scheduling and management of the Android system.

The kernel layer includes a display driver, a camera driver, an audio driver, and a sensor driver.

For example, as shown in FIG. 1, an NFC radio frequency field (RF field) is generally emitted by the NFC card reader 101, and one of 106 kbit/s, 212 kbit/s, and 424 kbit/s may be selected as a transmission speed for communication with the electronic device 100. The electronic device 100 may sense the radio frequency field emitted by the NFC card reader 101. Specifically, an NFC antenna (or a coil) of the electronic device 100 is a load of a transmit antenna (or a coil) of the NFC card reader 101. In this way, the electronic device 100 changes a parameter (for example, resonance and detuning) of an antenna loop, to modulate the NFC card reader 101, so that the electronic device 100 can transmit data back to the NFC card reader 101 at a same transmission speed. This implements data transmission from the electronic device 100 to the NFC card reader 101 with weak energy. A load-based modulation technology is used to obtain a data return capability, so that power consumption of the electronic device 100 can be greatly reduced and a battery endurance capability is improved.

Usually, the electronic device 100 may have three working modes: a reader/writer mode (Reader/Writer Mode), a point-to-point mode (P2P Mode), and a card emulation mode (Card Emulation Mode). In the card emulation mode, the electronic device 100 may emulate an emulated card by using a card emulation technology, to perform data interaction with the NFC card reader 101. The emulated card is a non-contact radio frequency card that is emulated by the electronic device 100 by using NFC hardware and that complies with an NFC-related standard. The card emulation mode is mainly used in non-contact scenarios such as consumption, transportation, and access. For example, a user can put the electronic device 100 close to the NFC card reader 101 and enter a password to confirm a transaction or directly receive a transaction. This makes it possible to use the electronic device 100 for a non-contact NFC service without changing existing facilities. The solution provided in embodiments of this application may be implemented based on the card emulation mode.

Figure 4:
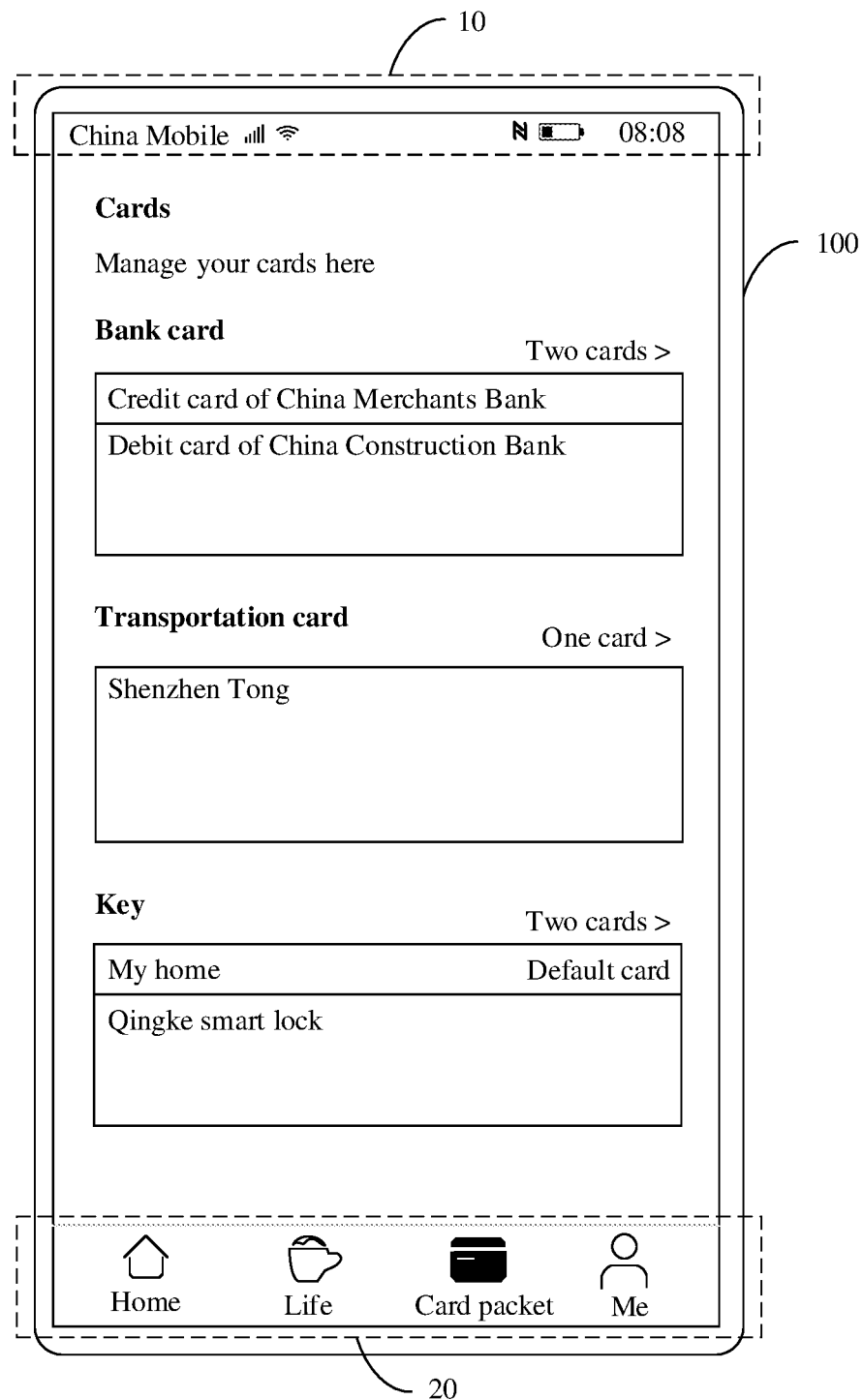
FIG. 4 is a schematic diagram of a cards interface of a wallet application according to some embodiments.

For example, as shown in FIG. 4, a schematic diagram of a cards interface of a wallet application is provided. The cards interface includes a status bar 10, cards, and a page switching bar 20.

The status bar 10 includes an operator, current time, a network status, and a power battery level. As shown in FIG. 4, the operator is China Mobile®, the current time is 08:08, the network status includes Wi-Fi and NFC, and a black part of the power battery level may represent a remaining power level of the electronic device 100.

The electronic device 100 may emulate a plurality of emulated cards by using the wallet application. For example, the emulated cards may include a bank card, a bus card, an access card, an electronic identity card, or a smart lock card. In this embodiment of this application, the bank card, the bus card, the access card, the electronic identity card, and the smart lock card are all classifications of the emulated cards. A type of the access card may include a unique identifier (Unique Identifier, UID for short) type or a Mifare® type. With promotion of an NFC service, there are more emulated cards in the electronic device 100. A user may view an emulated card added on the cards interface of the wallet application. For example, the cards in FIG. 4 include "Bank card", "Transport card", and "Key". "Bank card" includes a credit card of China Merchants Bank® and a debit card of China Construction Bank®, "Transport card" includes Shenzhen Tong®, and "Key" includes an access card and a smart lock card, where the access card includes "My home", and the smart lock card includes Qingke smart Lock®. The user may further add a new emulated card to the cards.

The page switching bar 20 includes a plurality of page switching buttons. The page switching button is used to implement switching of a plurality of pages in the wallet application. For example, as shown in FIG. 4, the plurality of page switching buttons include a "Home" button, a "Life" button, a "Cards" button, and a "Me" button. For example, when the user taps the "Cards" button, the electronic device 100 displays the cards interface.

Due to a limitation of a hardware technology, although a plurality of emulated cards are emulated in the wallet application, only one emulated card can be activated at a time. The user may set a default card in the wallet application. For example, as shown in FIG. 4, the user sets the access card "My home" as the default card. The activated card is the access card "My home". The NFC card reader 101 is a card reader of a Shenzhen bus turnstile. In this case, the user needs to switch the default card (the access card) to a target card (the bus card), to complete a card swiping operation.

Figure 5A:
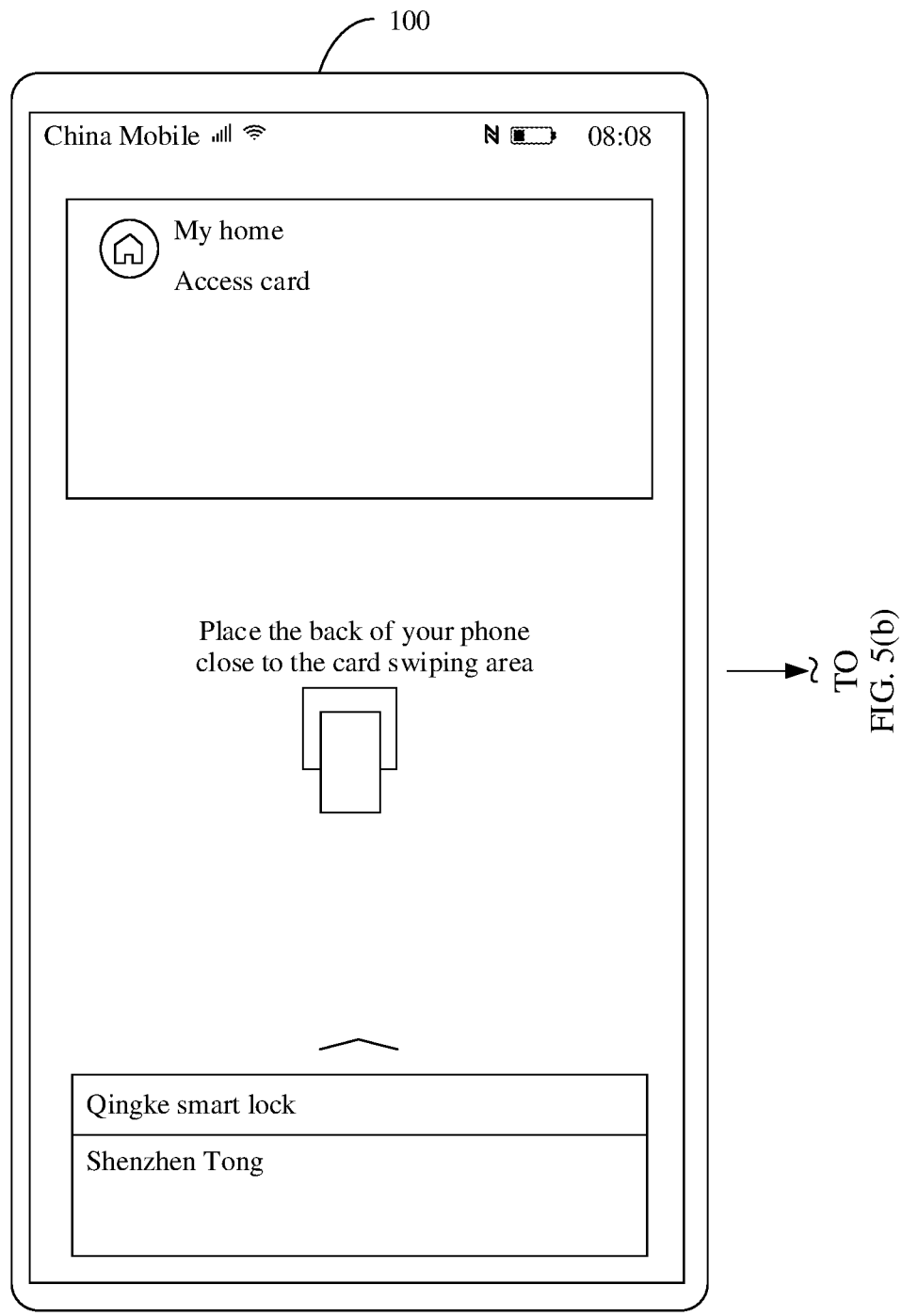
FIG. 5(a) to FIG. 5(d) are schematic diagrams of manual card switching in a related technology.
Figure 5B:
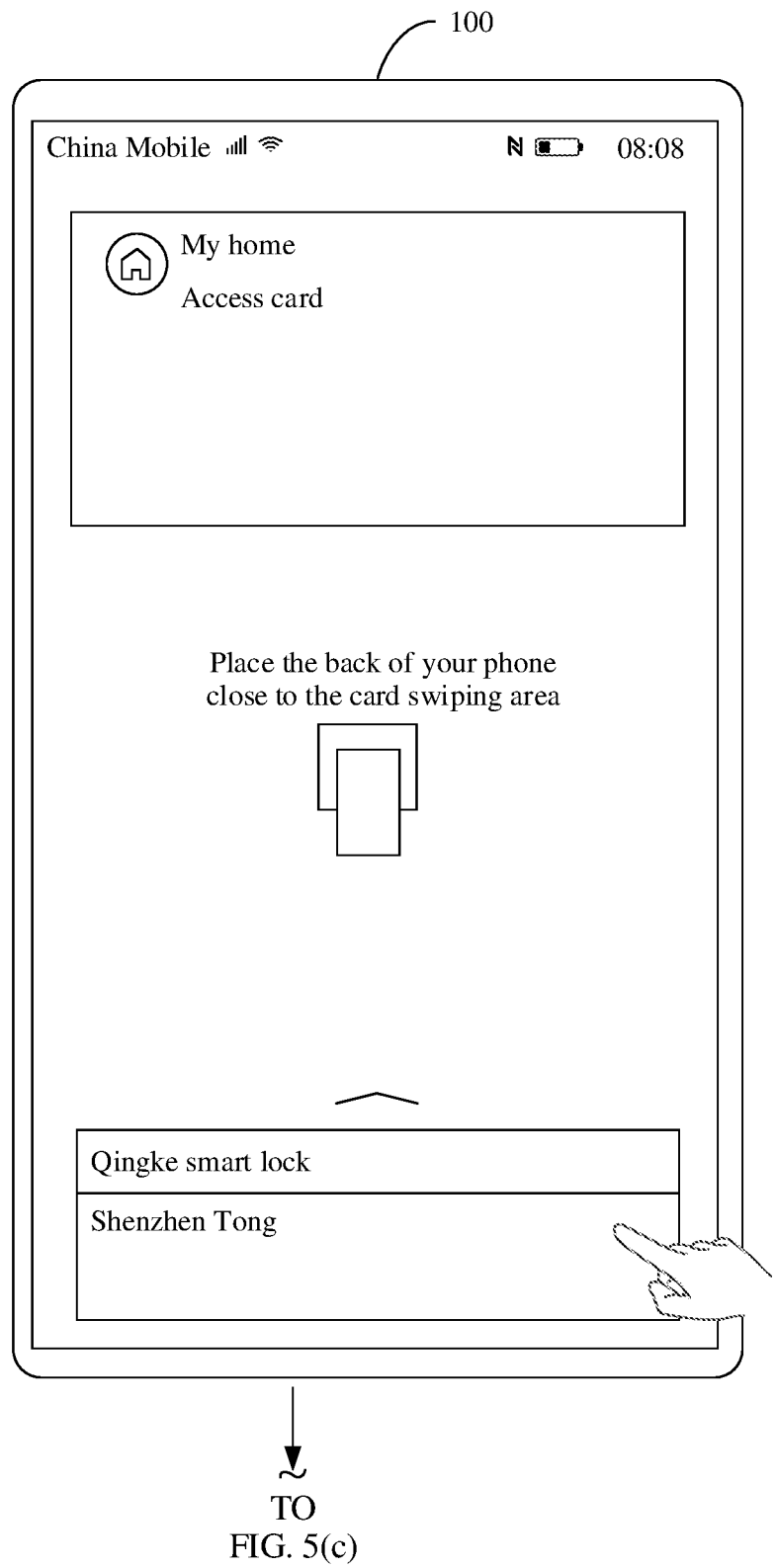
Figure 5C:
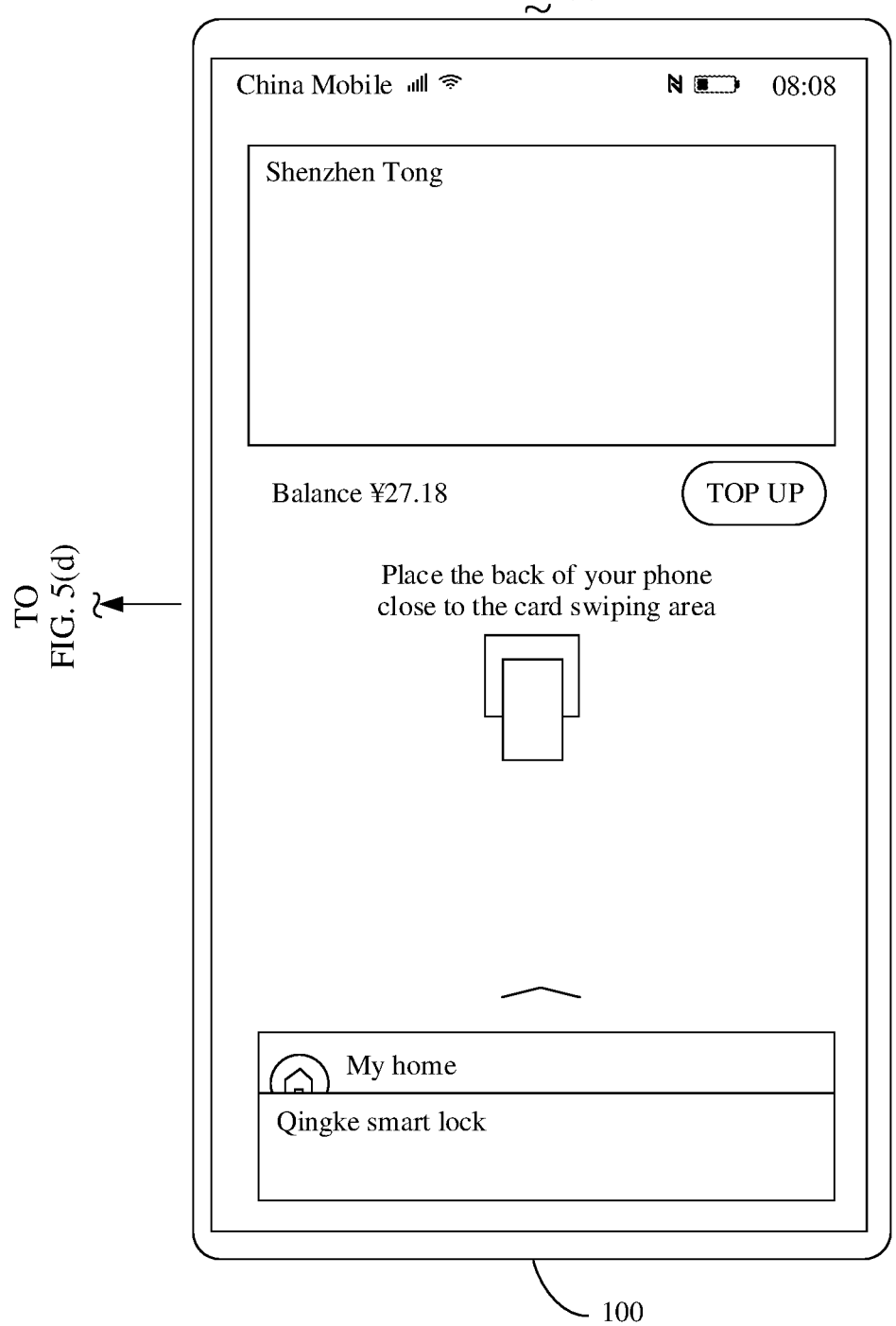
Figure 5D:
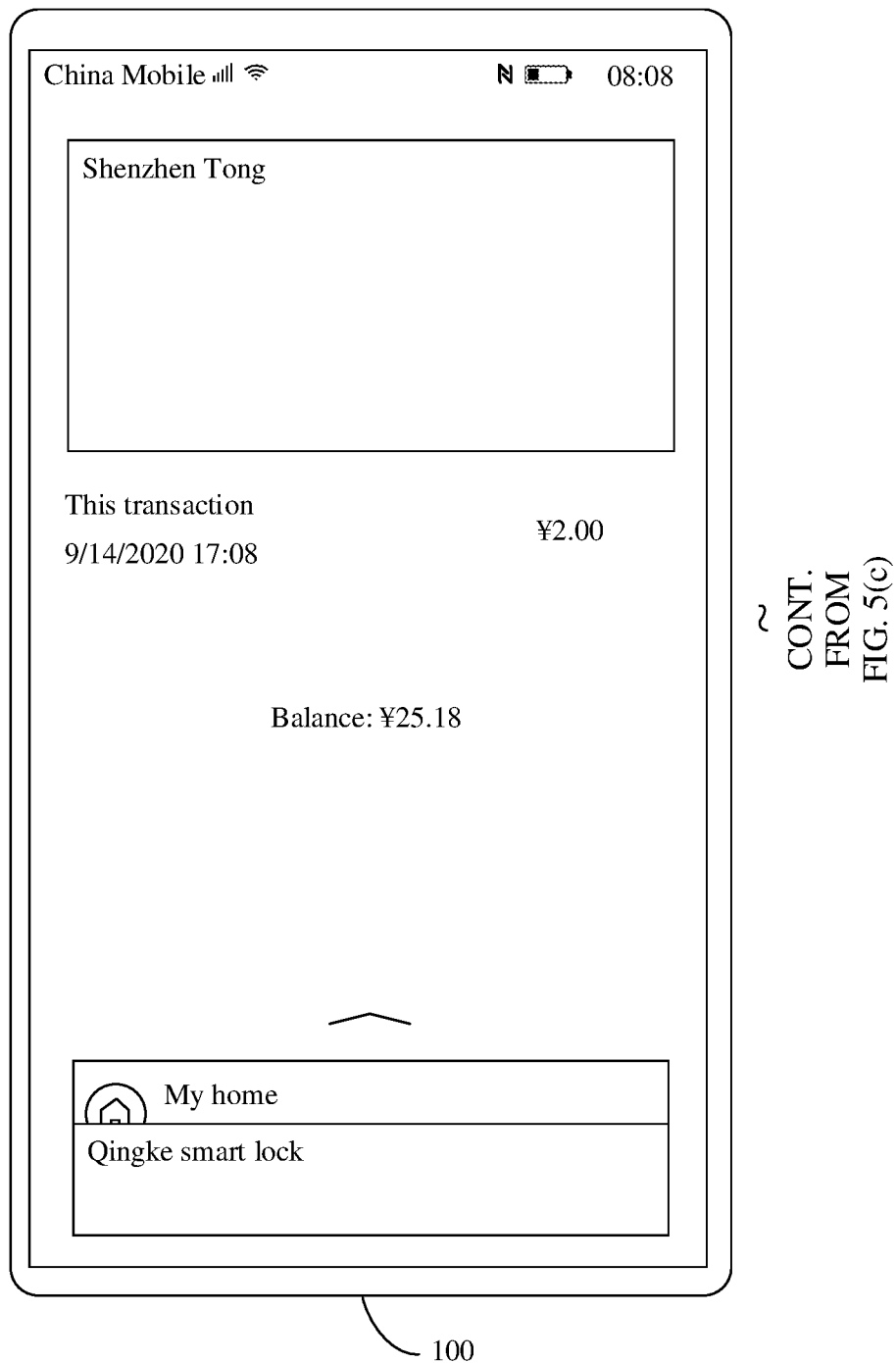

In a related technology, for example, as shown in FIG. 5(a) to FIG. 5(d), the access card is the default card, and the NFC card reader 101 is the card reader of the bus turnstile. When the user performs a card swiping operation on the bus turnstile by using the electronic device 100, the electronic device 100 displays the default card (the access card). As shown in FIG. 5(a), the electronic device 100 displays the access card "My home". In this case, the user needs to manually switch the access card to the bus card. As shown in FIG. 5(b), the user taps the bus card "Shenzhen Tong" on the electronic device 100. As shown in FIG. 5(c), the access card "My home" is switched to the bus card "Shenzhen Tong". The electronic device 100 displays the bus card "Shenzhen Tong", and displays a balance ¥27.18 of the bus card and a "TOP UP" button below the bus card. Then, as shown in FIG. 5(d), the electronic device 100 completes a card swiping transaction on the bus turnstile through the bus card "Shenzhen Tong", transaction time is Sep. 14, 2020 17:08, a transaction amount is ¥2.00, and a balance of the bus card is ¥25.18. In this solution, regardless of a type the NFC card reader 101, when detecting an NFC radio frequency field of the NFC card reader 101, the electronic device 100 always displays the default card. When the default card is the access card, and the NFC card reader 101 is the card reader of the bus turnstile, the user needs to manually switch the card, and perform a card swiping operation again after the card is switched. This reduces card swiping efficiency.

In another related technology, when the user performs a card swiping operation on the NFC card reader 101 by using the electronic device 100, after detecting an NFC radio frequency field of the NFC card reader 101, the electronic device 100 receives an NFC controller interface (NFC Controller Interface, NCI for short) flow sent by the NFC card reader 101. An NCI is a standard protocol for communication between the NFC controller 102 and an operating system. A type of the NCI may include a command type, a notification type, or a data type. An NCI of a notification type is an NCI that notifies the operating system side of a communication status after the NFC controller 102 communicates with the NFC card reader 101. The electronic device 100 selects, based on an obtained AID, an emulated card corresponding to the AID, and then switches the default card to the emulated card corresponding to the AID. However, when the default card is the access card, and the NFC card reader 101 is the card reader of the bus turnstile, because the NFC card reader 101 does not send an AID to the electronic device, the electronic device 100 cannot identify a card reading type of the NFC card reader 101 based on the AID, and the electronic device 100 cannot automatically switch the access card to the bus card based on the AID. The user needs to manually switch the card (for a manual card switching process, refer to FIG. 5(*a*) to FIG. 5(*d*)), and perform a card swiping operation again after the card is switched. This reduces card swiping efficiency.

Figure 6A:
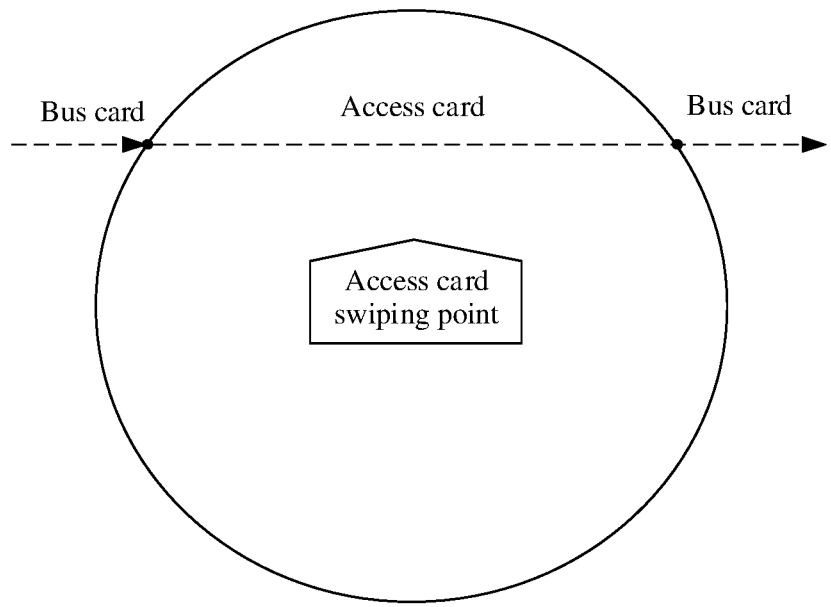
FIG. 6a and FIG. 6b are schematic diagrams of switching an emulated card based on a location in a related technology.
Figure 6B:
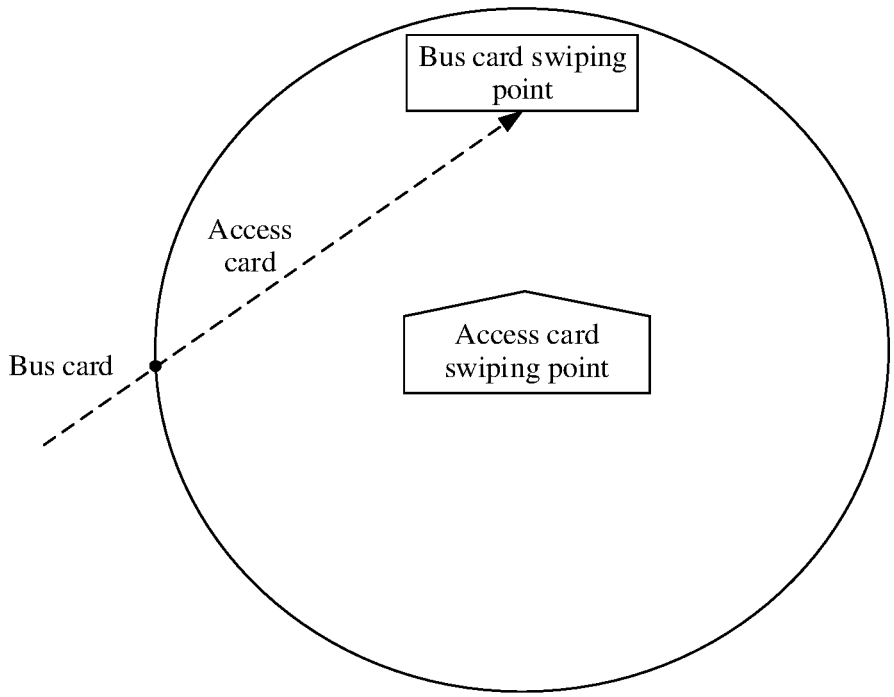

In still another related technology, for example, as shown in FIG. 6*a*, a solution of switching an emulated card based on a location is provided. A geo-fence is established by using an access card swiping point as a center, the geo-fence covers a predetermined area (an area shown by a circle in FIG. 6*a*), and an access card reader is disposed at the access card swiping point. Before the user enters the predetermined area of the geo-fence, that is, when a location of the electronic device 100 of the user is outside the predetermined area of the geo-fence, the activated card of the electronic device 100 is the default card (the bus card). When the user enters the predetermined area of the geo-fence, that is, when the location of the electronic device 100 of the user is within the predetermined area of the geo-fence, the electronic device 100 deactivates the default card (the bus card) and activates the access card, to switch the bus card to the access card based on the location. After the user leaves the predetermined area of the geo-fence, that is, when the location of the electronic device 100 of the user is outside the predetermined area of the geo-fence, the electronic device 100 deactivates the access card and activates the default card (the bus card), to restore the default card (the bus card). For example, as shown in FIG. 6*b*, usually, a fence radius of the geo-fence is large, and therefore the predetermined area of the geo-fence covers a bus card swiping point (or a subway card swiping point). The NFC card reader 101 is disposed at the bus card swiping point. In a process in which the user moves to the bus card swiping point, once the user enters the predetermined area of the geo-fence, the electronic device 100 switches the default card (the bus card) to the access card. Then, when the user moves to the bus card swiping point to perform a card swiping operation, because when the activated card is the access card, and the NFC card reader 101 is the card reader of the bus turnstile, the NFC card reader 101 does not send an AID to the electronic device. In this case, the electronic device 100 cannot identify the card reading type of the NFC card reader 101 based on the AID, and the electronic device 100 cannot automatically switch the access card to the bus card based on the AID. The user needs to manually switch the card (for the manual card switching process, refer to FIG. 5(*a*) to FIG. 5(*d*)), and perform a card swiping operation again after the card is switched. This reduces card swiping efficiency.

To resolve a problem in the foregoing related technology that card swiping efficiency is reduced because the user needs to manually switch a card in an emulated card switching process, an embodiment of this application provides an emulated card switching method. The method is applied to an electronic device. A first emulated card and a second emulated card are disposed on the electronic device, the first emulated card is an activated card, a card support protocol of the first emulated card is a first protocol, and a card support protocol of the second emulated card is a second protocol. The method includes: An NFC card reader obtains first information of the first emulated card from the electronic device, determines the first protocol based on the first information and a protocol supported by the NFC card reader, and performs a service process of the first protocol with the electronic device; if the electronic device obtains no identification information when the service process of the first protocol is performed, the electronic device modifies protocol information of the first emulated card from the first information to second information; the NFC card reader obtains the second information from the electronic device, determines the second protocol based on a card support protocol corresponding to the second information and the protocol supported by the NFC card reader, and performs a service process of the second protocol with the electronic device; and if the electronic device obtains identification information when the service process of the second protocol is performed, the electronic device switches, based on the identification information, the first emulated card to the second emulated card corresponding to the identification information.

In this embodiment of this application, if the first protocol includes a protocol for which no identification information is selected, performing the service process of the first protocol includes: performing a service process of the protocol for which no identification information is selected.

In this embodiment of this application, if the second protocol includes a protocol for which no identification information is selected and a protocol for which identification information is selected, performing the service process of the second protocol includes: performing a service process of the protocol for which no identification information is selected and performing a service process of the protocol for which the identification information is selected.

For example, the identification information includes an AID, and the protocol information of the first emulated card includes a select acknowledge (Select Acknowledge, SAK for short).

In this embodiment of this application, the electronic device includes a processor and an NFC controller. The NFC controller sends the first information of the first emulated card to the NFC card reader, so that the NFC card reader determines the first protocol based on the first information and the protocol supported by the NFC card reader, and performs the service process of the first protocol with the electronic device. The NFC controller sends, to the processor, first service information generated when the NFC card reader performs the service process of the first protocol with the electronic device. The processor exchanges information with the NFC controller if the first service information does not include the identification information, so that the NFC controller modifies the protocol information of the first emulated card from the first information to the second information. The NFC controller sends the second information to the NFC card reader, so that the NFC card reader obtains the second information from the electronic device, determines the second protocol based on the second information and the protocol supported by the NFC card reader, and performs the service process of the second protocol with the electronic device. The NFC controller sends, to the processor, second service information generated when the NFC card reader performs the service process of the second protocol with the electronic device. The processor triggers the second NFC controller if the second service information includes the identification information. The NFC controller switches, based on the identification information, the first emulated card to the second emulated card corresponding to the identification information.

In this embodiment of this application, the first service information includes a first NCI flow. The processor is specifically configured to: if no NFC radio frequency activation notification message in the first NCI flow sent by the NFC controller is received within a first specified time period, determine that the first service information does not include the identification information; or the processor is specifically configured to: if an NFC radio frequency activation notification message in the first NCI flow sent by the NFC controller is received within a first specified time period, and no AID notification message in the first NCI flow sent by the NFC controller is received within a second specified time period, determine that the first service information does not include the identification information.

In this embodiment of this application, the second service information includes a second NCI flow. The processor is specifically configured to: if an NFC radio frequency activation notification message in the second NCI flow sent by the NFC controller is received within the first specified time period, and an AID notification message in the second NCI flow sent by the NFC controller is received within the second specified time period, determine that the second service information includes the identification information.

In this embodiment of this application, that the processor exchanges information with the NFC controller if the first service information does not include the identification information specifically includes: The processor sends a configuration control command to the NFC controller if the first service information does not include the identification information; the NFC controller sends a configuration control command response message to the processor; the processor sends a parameter configuration command to the NFC controller, where the parameter configuration command includes the second information; and the NFC controller sends a parameter configuration command response message to the processor.

In this embodiment of this application, the processor is configured to exchange information with the NFC controller if the second service information includes the identification information, so that the NFC controller modifies the protocol information of the first emulated card from the second information to the first information. That the processor exchanges information with the NFC controller if the first service information includes the identification information specifically includes: The processor sends a configuration control command to the NFC controller if the first service information includes the identification information; the NFC controller sends a configuration control command response message to the processor; the processor sends a parameter configuration command to the NFC controller, where the parameter configuration command includes the first information; and the NFC controller sends a parameter configuration command response message to the processor.

In this embodiment of this application, the electronic device adjusts the protocol information of the activated card (the first emulated card), so that the NFC card reader can perform a service process of a specified protocol with the electronic device based on adjusted protocol information and the protocol supported by the NFC card reader. When performing the service process of the specified protocol, the electronic device obtains the identification information, and automatically switches, based on the identification information, the first emulated card to the second emulated card corresponding to the identification information. In this way, automatic card switching is implemented, and card swiping efficiency is improved.

The first emulated card and the second emulated card are disposed on the electronic device. The first emulated card is different from the second emulated card. For example, the first emulated card is an access card, and the second emulated card is a bus card. For example, the first emulated card is an access card "My home", and the second emulated card is a bus card "Shenzhen Tong".

The electronic device emulates different types of emulated cards by using a card simulation technology. For example, the emulated cards may be classified into a local bus card, an interconnection traffic card, an access card "My home", and a Qingke smart lock card based on types. Different local bus cards may be of different types. For example, the local bus cards may include Shenzhen Tong, Shanghai Tong, and the like, and Shenzhen Tong and Shanghai Tong are emulated cards of different types. Different interconnection traffic cards may be of a same type. For example, the interconnection traffic cards may include a Shenzhen Tong interconnection card, a Beijing-Tianjin-Hebei interconnection card, and the like, and the Shenzhen Tong interconnection card and the Beijing-Tianjin-Hebei interconnection card are emulated cards of a same type.

It should be noted that the foregoing emulated card is an example description of this embodiment of this application, and the emulated card may further include another type of emulated card. This is not limited in this embodiment of this application.

For example, Table 1 shows protocols supported by different types of emulated cards.

TABLE 1

| Emulated card | SAK | Card support protocol |
|---|---|---|
| Access card "My home" | 0x08 | ISO14443-3 protocol |
| Shenzhen Tong | 0x20 | ISO14443-3 protocol and ISO14443-4 protocol |
| Shenzhen Tong interconnection card | 0x20 | ISO14443-3 protocol and ISO14443-4 protocol |
| Composite card | 0x28 | ISO14443-3 protocol and ISO14443-4 protocol |

As shown in Table 1, an SAK indicates a card support protocol, and the card support protocol is a protocol supported by an emulated card. For example, one type of emulated card may have one SAK, and one SAK may correspond to one or more card support protocols. For example, the SAK of the access card "My home" is 0x08, so that the card support protocol of the access card "My home" includes the ISO14443-3 protocol. The SAKs of Shenzhen Tong and the Shenzhen Tong interconnection card are 0x20, so that the card support protocol of Shenzhen Tong and the card support protocol of the Shenzhen Tong interconnection card include the ISO14443-3 protocol and the ISO14443-4 protocol. The SAK of the composite card is 0x28, so that the card support protocol of the composite card includes the ISO14443-3 protocol and the ISO14443-4 protocol. The composite card is an emulated card that supports both the ISO14443-3 protocol and the ISO14443-4 protocol.

For example, the NFC card reader 101 may include a plurality of types of card readers such as a card reader of a Shenzhen bus turnstile, a card reader of a Shanghai bus turnstile, a card reader of a community access control system, a card reader of a company access control system, and a card reader of a Qingke smart lock. It should be noted that the foregoing listed NFC card readers are example descriptions of this embodiment of this application. The NFC card reader may further include another type of card reader. This is not limited in this embodiment of this application.

For example, Table 2 shows protocols supported by different types of NFC card readers and corresponding AIDs.

TABLE 2

| NFC card reader | Protocol supported by the NFC card reader | AID corresponding to the NFC card reader | Emulated card |
|---|---|---|---|
| Card reader of a community access control system | ISO14443-3 protocol | None | Access card "My home" |
| Card reader of a Shenzhen bus turnstile | ISO14443-3 protocol and ISO14443-4 protocol | 535a542e57414c4c45542e454e56 A000000632010105 | Shenzhen Tong Shenzhen Tong interconnection card |
| Card reader of a Shanghai bus turnstile | ISO14443-3 protocol and ISO14443-4 protocol | A00000033301010200063485750415902 | Shanghai Tong |

As shown in Table 2, for example, one type of card reader may support one or more protocols. For example, the card reader of the community access control system supports the ISO14443-3 protocol, the card reader of the Shenzhen bus turnstile supports the ISO14443-3 protocol and the ISO14443-4 protocol, and the card reader of the Shanghai bus turnstile supports the ISO14443-3 protocol and the ISO14443-4 protocol.

An AID is an ID of an application (Application) stored in a secure element or an application on an operating system side. For an NFC application scenario, one AID corresponds to one type of emulated card. An AID may indicate a card reading type of an NFC card reader. Therefore, if the electronic device obtains an AID, the electronic device may recognize a card reading type of a card reader based on the AID. The electronic device may switch, based on the AID, the activated card to an emulated card corresponding to the AID, so that automatic card switching is implemented, and card swiping efficiency is improved.

For example, when the AID is 535a542e57414c4c45542e454e56, the emulated card corresponding to the AID is Shenzhen Tong.

For example, when the AID is A000000632010105, the emulated card corresponding to the AID is the Shenzhen Tong interconnection card. The Beijing-Tianjin-Hebei interconnection card and the Shenzhen-Tong interconnection card are emulated cards of a same type. Therefore, an AID of the Beijing-Tianjin-Hebei interconnection card is also A000000632010105.

For example, the protocol supported by the card reader of the community access control system is the ISO14443-3 protocol. Because the ISO14443-3 protocol is a protocol for which no AID is selected, the card reader of the community access control system does not have a corresponding AID.

The card reading type of the NFC card reader may include a type of an emulated card that can be read by the electronic device. As shown in Table 2, one NFC card reader may correspond to one or more AIDs. In other words, one NFC card reader can read one or more types of emulated cards. For example, the card reader of the Shenzhen bus turnstile corresponds to two AIDs, so that the card reader of the Shenzhen bus turnstile can read two types of emulated cards: Shenzhen Tong and the Shenzhen Tong interconnection card. The card reader of the Shanghai bus turnstile corresponds to one AID, so that the card reader of the Shanghai bus turnstile can read one type of emulated card, namely, Shanghai Tong.

As shown in Table 1 and Table 2, for example, a protocol for which no AID is selected includes the ISO14443-3 protocol, and a protocol for which an AID is selected includes the ISO14443-4 protocol. When SAK=0x08, a card support protocol corresponding to the SAK includes the ISO14443-3 protocol. When SAK=0x20 or SAK=0x28, a card support protocol corresponding to the SAK includes the ISO14443-3 protocol and the ISO14443-4 protocol.

For example, the NFC card reader reads SAK=0x08 from the electronic device, where SAK=0x08 indicates that the first emulated card supports only the ISO14443-3 protocol and does not support the ISO14443-4 protocol. The NFC card reader performs a service process of the ISO14443-3 protocol, and does not perform a service process of the ISO14443-4 protocol. In this case, the NFC card reader performs a service process of the protocol for which no AID is selected. Therefore, the ISO14443-3 protocol may be referred to as a protocol for which no identification information (an AID) is selected.

For example, the NFC card reader reads SAK=0x20 or SAK=0x28 from the electronic device, where SAK=0x20 or SAK=0x28 indicates that the first emulated card supports the ISO14443-3 protocol and the ISO14443-4 protocol. The NFC card reader performs a service process of the ISO14443-3 protocol and a service process of the ISO14443-4 protocol. The NFC card reader supports performing the service process of the ISO14443-4 protocol, and the NFC card reader can perform a service process of the protocol for which an AID is selected. Therefore, the ISO14443-4 protocol may be referred to as a protocol for which identification information (an AID) is selected.

The NFC card reader may determine the first protocol based on the SAK and the protocol supported by the NFC card reader, and perform the service process of the first protocol with the electronic device. After reading the SAK from the electronic device, the NFC card reader may determine, based on the SAK, a card support protocol corresponding to the SAK, determine the first protocol based on the card support protocol corresponding to the SAK and the protocol supported by the NFC card reader, and perform the service process of the first protocol with the electronic device. For example, if the card support protocol corresponding to the SAK includes the protocol for which no AID is selected (for example, the ISO14443-3 protocol), and the protocol supported by the NFC card reader includes the protocol for which no AID is selected (for example, the ISO14443-3 protocol) and the protocol for which an AID is selected (for example, the ISO14443-4 protocol), the first protocol determined by the NFC card reader includes the protocol for which no AID is selected (for example, the ISO14443-3 protocol). For another example, if the card support protocol corresponding to the SAK includes the protocol for which no AID is selected (for example, the ISO14443-3 protocol), and the protocol supported by the NFC card reader includes the protocol for which no AID is selected (for example, the ISO14443-3 protocol), the first protocol determined by the NFC card reader includes the protocol for which no AID is selected (for example, the ISO14443-3 protocol). For still another example, if the card support protocol corresponding to the SAK includes the protocol for which no AID is selected (for example, the ISO14443-3 protocol) and the protocol for which an AID is selected (for example, the ISO14443-4 protocol), and the protocol supported by the NFC card reader includes the protocol for which no AID is selected (for example, the ISO14443-3 protocol), the first protocol determined by the NFC card reader includes the protocol for which no AID is selected (for example, the ISO14443-3 protocol). For yet another example, if the card support protocol corresponding to the SAK includes the protocol for which no AID is selected (for example, the ISO14443-3 protocol) and the protocol for which an AID is selected (for example, the ISO14443-4 protocol), and the protocol supported by the NFC card reader includes the protocol for which an AID is selected (for example, the ISO14443-3 protocol) and the protocol for which an AID is selected (for example, the ISO14443-4 protocol), the first protocol determined by the NFC card reader includes the protocol for which no AID is selected (for example, the ISO14443-3 protocol) and the protocol for which an AID is selected (for example, the ISO14443-4 protocol). In a process in which the electronic device performs the service process of the first protocol with the NFC card reader, the first NCI flow is generated. Then, if the electronic device determines that the first NCI flow does not include an AID, the electronic device determines that a protocol information adjustment condition is met, and the SAK needs to be modified. For example, SAK=0x08 is modified to SAK=0x20, or SAK=0x08 is modified to SAK=0x28. If the electronic device determines that the first NCI flow includes an AID, the electronic device determines that a protocol information adjustment condition is not met, and the SAK does not need to be modified. In this case, the card support protocol corresponding to the SAK includes the protocol for which an AID is selected, for example, the ISO14443-4 protocol, where SAK=0x20 or SAK=0x28.

After the electronic device determines whether the protocol information adjustment condition is met and modifies the SAK or does not modify the SAK, the card support protocol corresponding to the SAK includes the protocol for which an AID is selected (for example, the ISO14443-4 protocol). Then, the NFC card reader may further determine the second protocol based on the SAK and the protocol supported by the NFC card reader, and perform the service process of the second protocol with the electronic device. After reading the SAK from the electronic device again, the NFC card reader may determine, based on the SAK read again, a card support protocol corresponding to the SAK, determine the second protocol based on the card support protocol corresponding to the SAK and the protocol supported by the NFC card reader, and perform the service process of the second protocol with the electronic device. In this case, the card support protocol corresponding to the SAK includes the protocol for which an AID is selected (for example, the ISO14443-4 protocol). Based on this, if the protocol supported by the NFC card reader includes the protocol for which no AID is selected (for example, the ISO14443-3 protocol), the second protocol determined by the NFC card reader includes a protocol for which no AID is selected (for example, the ISO14443-3 protocol). If the protocol supported by the NFC card reader includes the protocol for which no AID is selected (for example, the ISO14443-3 protocol) and the protocol for which an AID is selected (for example, the ISO14443-4 protocol), the second protocol determined by the NFC card reader includes the protocol for which no AID is selected (for example, the ISO14443-3 protocol) and the protocol for which an AID is selected (for example, the ISO14443-4 protocol). In a process in which the electronic device performs the service process of the second protocol with the NFC card reader, the second NCI flow is generated. If the second protocol includes the protocol for which no AID is selected (for example, the ISO14443-3 protocol) and the protocol for which an AID is selected (for example, the ISO14443-4 protocol), the NFC card reader sends the AID to the electronic device in a process of performing the service process of the second protocol with the electronic device. Therefore, the second NCI flow generated by the electronic device includes the AID. Then, when the electronic device determines that the second NCI flow includes the AID, the electronic device determines that a card switching condition is met and a card switching operation needs to be performed. If the second protocol includes the protocol for which no AID is selected (for example, the ISO14443-3 protocol), the NFC card reader does not send an AID to the electronic device in a process of performing the service process of the second protocol with the electronic device. Therefore, the second NCI flow generated by the electronic device does not include the AID. When the electronic device determines that the second NCI flow does not include the AID, the electronic device determines that a card switching condition is not met and a card switching operation does not need to be performed.

It should be noted that, if the NFC card reader determines that the first protocol includes the protocol for which no AID is selected (for example, the ISO14443-3 protocol) and the protocol for which an AID is selected (for example, the ISO14443-4 protocol), in a process in which the NFC card reader and the electronic device perform the service process of the first protocol, the NFC card reader and the electronic device first perform a service process of the protocol for which no AID is selected (for example, the ISO14443-3 protocol), and then perform a service process of the protocol for which an AID is selected (for example, the ISO14443-4 protocol).

It should be noted that, if the NFC card reader determines that the second protocol includes the protocol for which no AID is selected (for example, the ISO14443-3 protocol) and the protocol for which an AID is selected (for example, the ISO14443-4 protocol), in a process in which the NFC card reader and the electronic device perform the service process of the second protocol, the NFC card reader and the electronic device first perform a service process of the protocol for which no AID is selected (for example, the ISO14443-3 protocol), and then perform a service process of the protocol for which an AID is selected (for example, the ISO14443-4 protocol).

With reference to an emulated card switching scenario, the following describes an example of an emulated card switching method by using some specific embodiments.

In some embodiments, the activated card is an access card. The user may set the access card as the default card on the electronic device, so that the activated card is the access card. Alternatively, as shown in FIG. 6b, a geo-fence is established by using an access card reader as a center, and a predetermined area of the geo-fence covers a bus turnstile. The user may set a bus card as the default card on the electronic device, and switch the default card (the bus card) to the access card by using a geo-fence technology. For specific descriptions, refer to descriptions of FIG. 6b.

Figure 7:
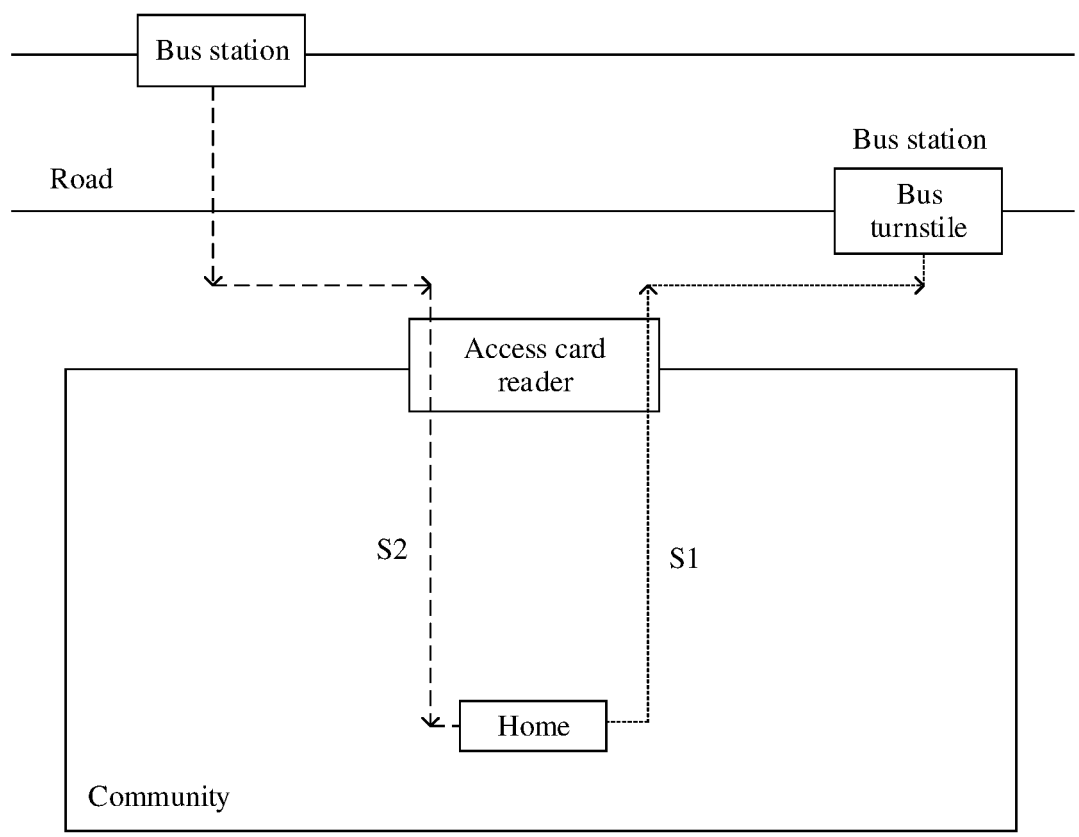
FIG. 7 is a schematic diagram of an emulated card switching method according to some embodiments.
Figure 8A:
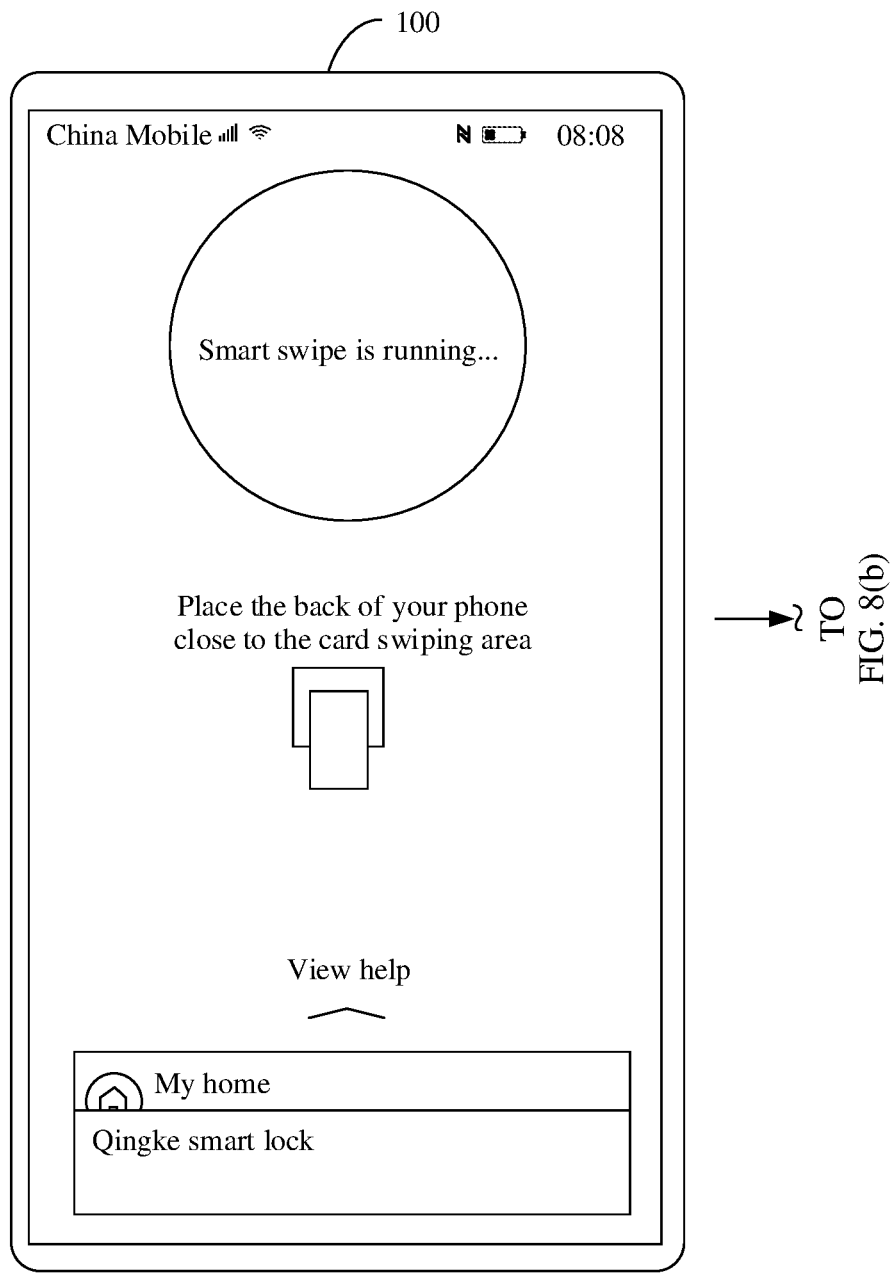
FIG. 8(a) to FIG. 8(c) are schematic diagrams of interfaces for a bus card swiping operation according to some embodiments.
Figure 8B:
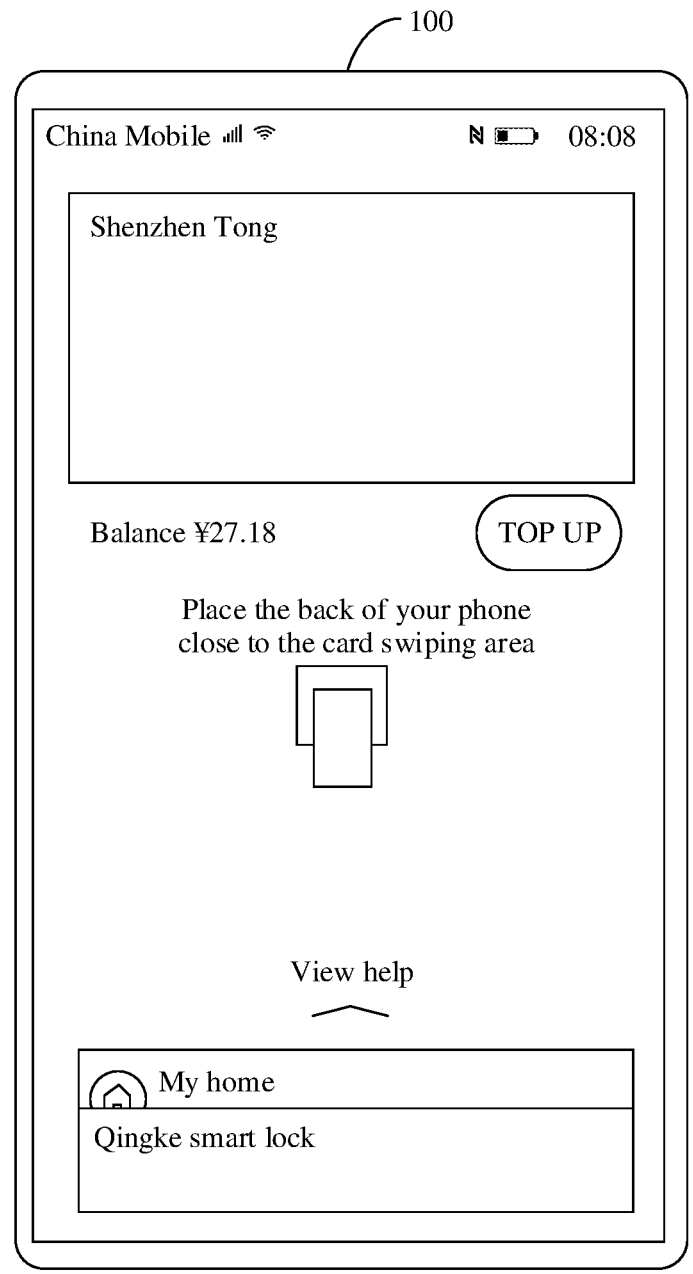
Figure 8C:
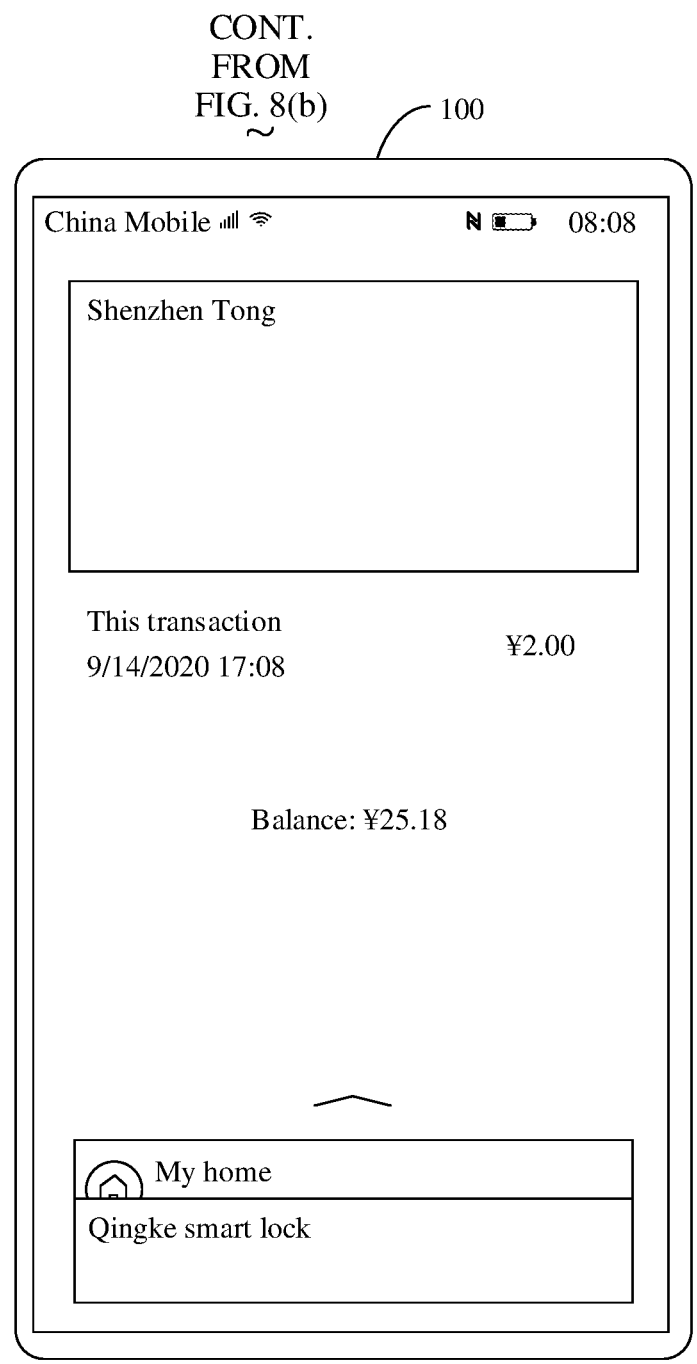

For example, as shown in FIG. 7, the user moves from home in a community along a path $S_1$ to a bus station outside the community, and performs a card swiping operation on a bus turnstile. The user places the back of the electronic device 100 close to a card reader of the bus turnstile. As shown in FIG. 8(a), the electronic device 100 displays a prompt "Smart swipe is running" and a prompt "Place the back of your phone close to the card swiping area". The card reader of the bus turnstile reads SAK from the electronic device 100. Because the activated card is the access card "My home", the read SAK is 0x08. The card reader of the bus turnstile determines, based on the read SAK (0x08), that a card support protocol corresponding to the SAK is the ISO14443-3 protocol. Therefore, the card reader of the bus turnstile determines, based on the ISO14443-3 protocol corresponding to the SAK and the ISO14443-3 protocol and the ISO14443-4 protocol that are supported by the card reader of the bus turnstile, that the first protocol includes the ISO14443-3 protocol, and performs a service process of the ISO14443-3 protocol. Then, the electronic device 100 determines that an NCI flow generated when the service process of the ISO14443-3 protocol is performed does not include an AID. Therefore, the access card cannot be switched to the bus card corresponding to the AID based on the AID. To switch to the bus card, the electronic device 100 configures the SAK as 0x20, that is, modifies SAK=0x08 to SAK=0x20. In this case, the card reader of the bus turnstile reads SAK from the electronic device again, and the read SAK is 0x20. The card reader of the bus turnstile determines, based on the read SAK (0x20), that a card support protocol corresponding to the SAK is the ISO14443-4 protocol, and the card reader of the bus turnstile supports the ISO14443-4 protocol. Therefore, the card reader of the bus turnstile determines, based on the ISO14443-3 protocol corresponding to the SAK and the ISO14443-3 protocol and the ISO14443-4 protocol that are supported by the card reader of the bus turnstile, that the second protocol includes the ISO14443-3 protocol and the ISO14443-4 protocol, and performs service processes of the ISO14443-3 protocol and the ISO14443-4 protocol. Then, the electronic device 100 determines that an NCI flow generated when the service processes of the ISO14443-3 protocol and the ISO14443-4 protocol are performed includes an AID, determines that a card switching operation is performed, and switches the access card "My home" to the bus card "Shenzhen Tong" corresponding to the AID based on the AID. That is, the electronic device 100 deactivates the access card "My home" and activates "Shenzhen Tong". As shown in FIG. 8(b), the activated bus card "Shenzhen Tong" pops up on the electronic device 100. In addition, a balance of the bus card of ¥27.18 and a "TOP UP" button is displayed below the bus card "Shenzhen Tong". The electronic device 100 completes a card swiping transaction on the bus turnstile through the bus card "Shenzhen Tong". As shown in FIG. 8(c), the electronic device 100 displays a current transaction amount of ¥2.00, displays current transaction time of Sep. 14, 2020 17:08, and displays the balance of the bus card of ¥25.18.

Figure 9A:
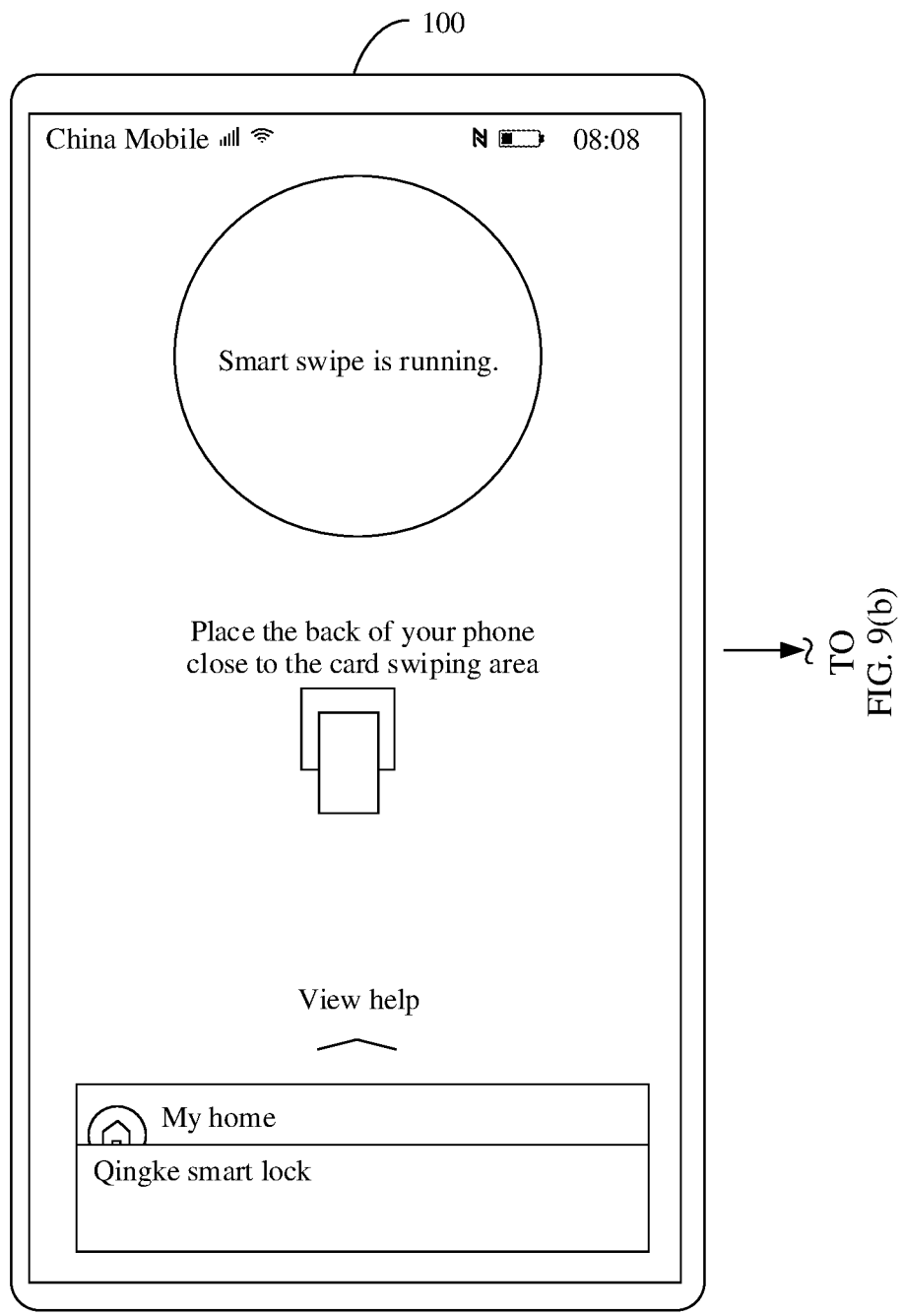
FIG. 9(a) to FIG. 9(c) are schematic diagrams of interfaces for an access card swiping operation according to some embodiments.
Figure 9B:
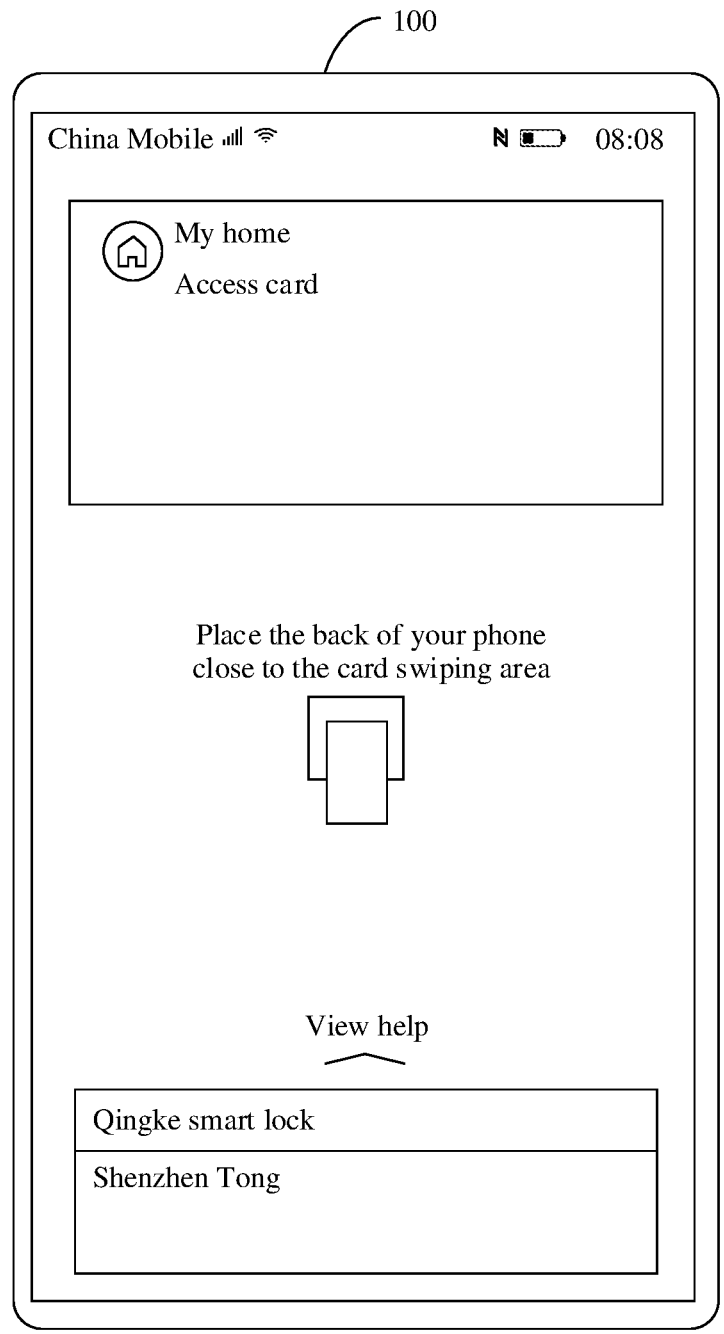
Figure 9C:
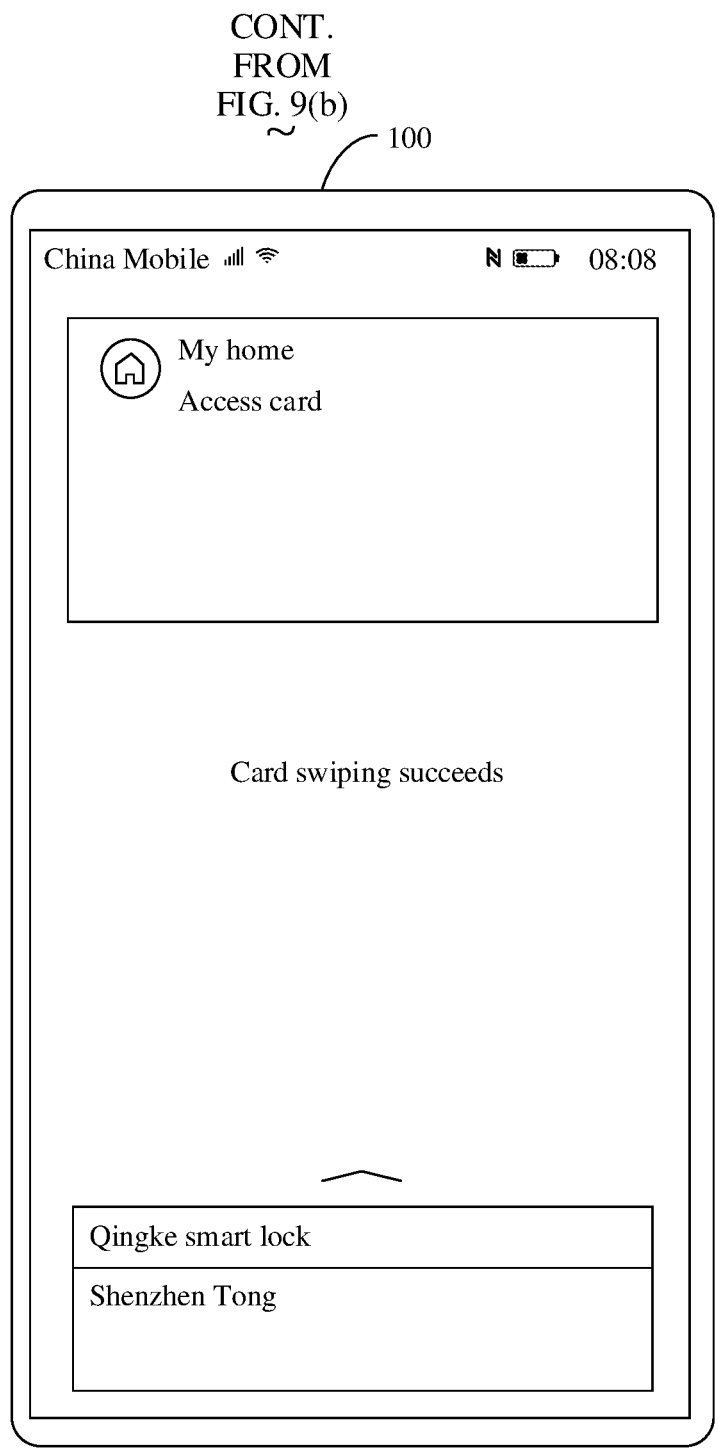

For example, as shown in FIG. 7, after getting on and off from a bus, the user first moves along a path S2 from the bus station to a location of the access card reader in the community, and performs a card swiping operation on the access card reader. The user places the back of the electronic device close to the access card reader. As shown in FIG. 9(a), the electronic device 100 displays the prompt "Smart swipe is running", and displays the prompt "Place the back of your phone close to the card swiping area". The access card reader reads SAK from the electronic device 100. Because the activated card is the access card "My home", the read SAK is 0x08. The access card reader determines, based on the read SAK (0x08), that a card support protocol corresponding to the SAK is the ISO14443-3 protocol. Therefore, the access card reader determines, based on the ISO14443-3 protocol corresponding to the SAK and the ISO14443-3 protocol and the ISO14443-4 protocol that are supported by the card reader of the bus turnstile, that the first protocol includes the ISO14443-3 protocol, and performs a service process of the ISO14443-3 protocol. Then, the electronic device 100 determines that an NCI flow generated when the service process of the ISO14443-3 protocol is performed does not include an AID. Therefore, the electronic device 100 configures the SAK as 0x20, that is, modifies SAK=0x08 to SAK=0x20. In this case, the access card reader reads SAK from the electronic device again, and the read SAK is 0x20. The access card reader determines, based on the read SAK (0x20), that a card support protocol corresponding to the SAK is the ISO14443-4 protocol and a protocol supported by the access card reader is the ISO14443-3 protocol. Regardless of a value of the SAK and the card support protocol corresponding to the SAK, because the protocol supported by the access card reader is the ISO14443-3 protocol, when determining the second protocol based on the ISO14443-4 protocol corresponding to the SAK and the ISO14443-3 protocol and the ISO14443-4 protocol that are supported by the access card reader, the access card reader finally determines that the second protocol is the ISO14443-3 protocol, and performs a service process of the ISO14443-3 protocol with the electronic device. The electronic device 100 determines that an NCI flow generated when the service process of the ISO14443-3 protocol is performed does not include an AID, and cannot perform an AID-based card switching operation. Therefore, the electronic device 100 does not perform a card switching operation on the access card. As shown in FIG. 9(b), the access card "My home" pops up on the electronic device 100. The electronic device 100 completes a card swiping operation through the access card and the access card reader. As shown in FIG. 9(c), the electronic device 100 displays "Card swiping succeeds", then a door of the community is opened, and the user continues to move to a location of home along the path S2.

It should be noted that the schematic diagrams of the interfaces of the electronic device shown in FIG. 4, FIG. 8(a) to FIG. 8(c), and FIG. 9(a) to FIG. 9(c) are examples of embodiments of this application. The schematic diagrams of the interfaces of the electronic device may also be in another style. This is not limited in embodiments of this application.

The following uses a specific embodiment to describe an example of a working process of an emulated card switching method. The solution in this embodiment may be applied to an electronic device in a screen-off state or a screen-on state.

Figure 10A:
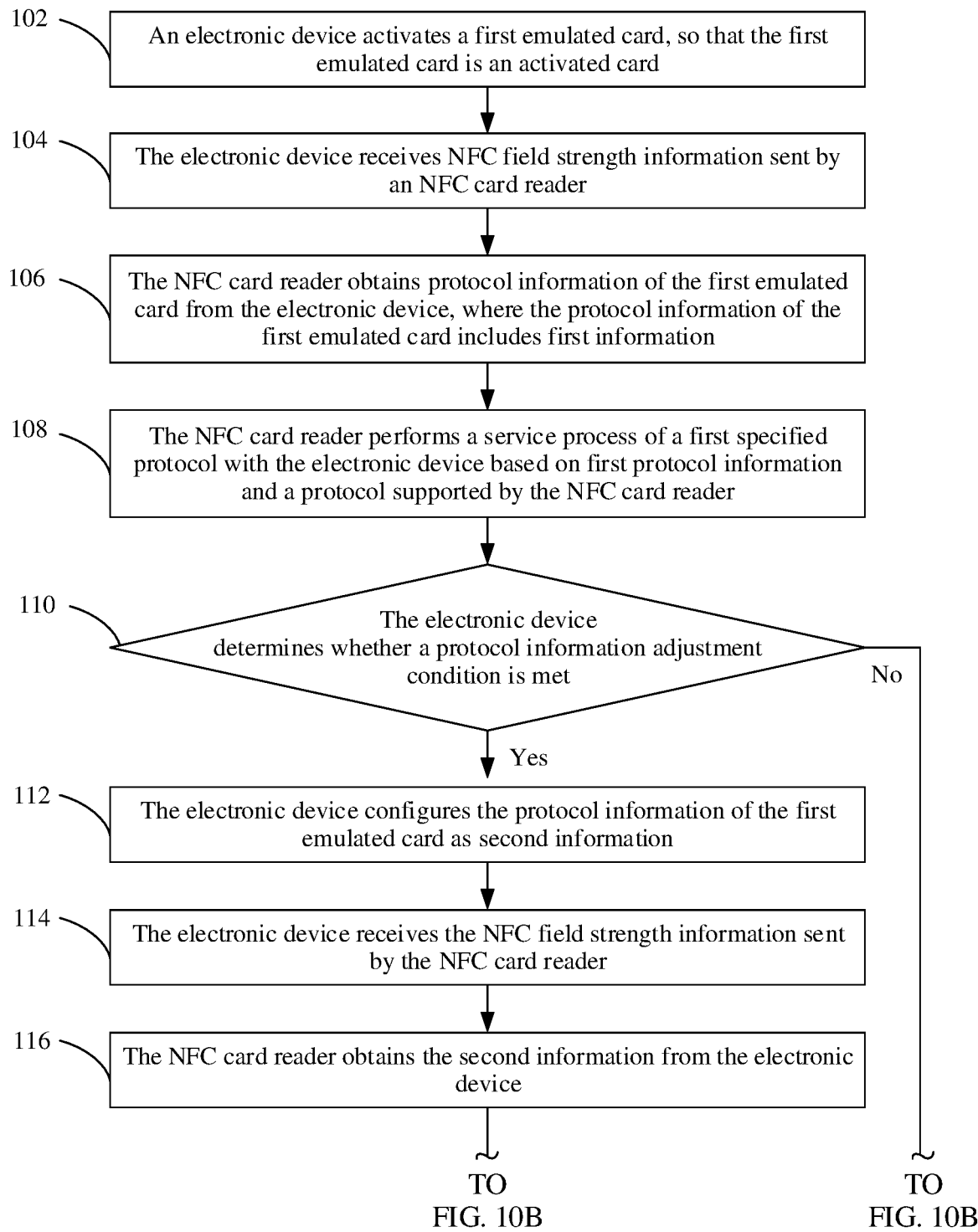
FIG. 10A and FIG. 10B are a flowchart of an emulated card switching method according to some embodiments.
Figure 10B:
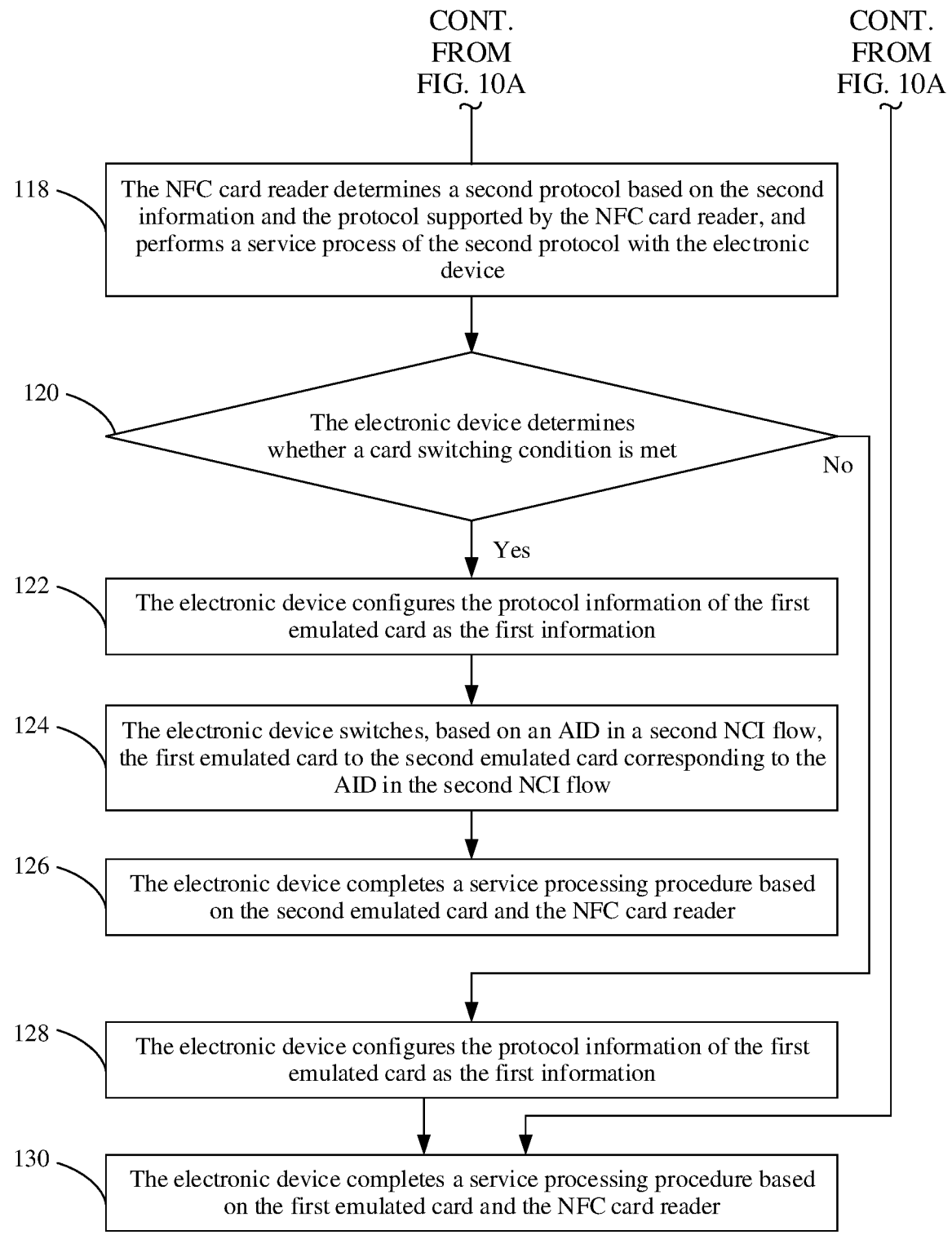
Figure 11A:
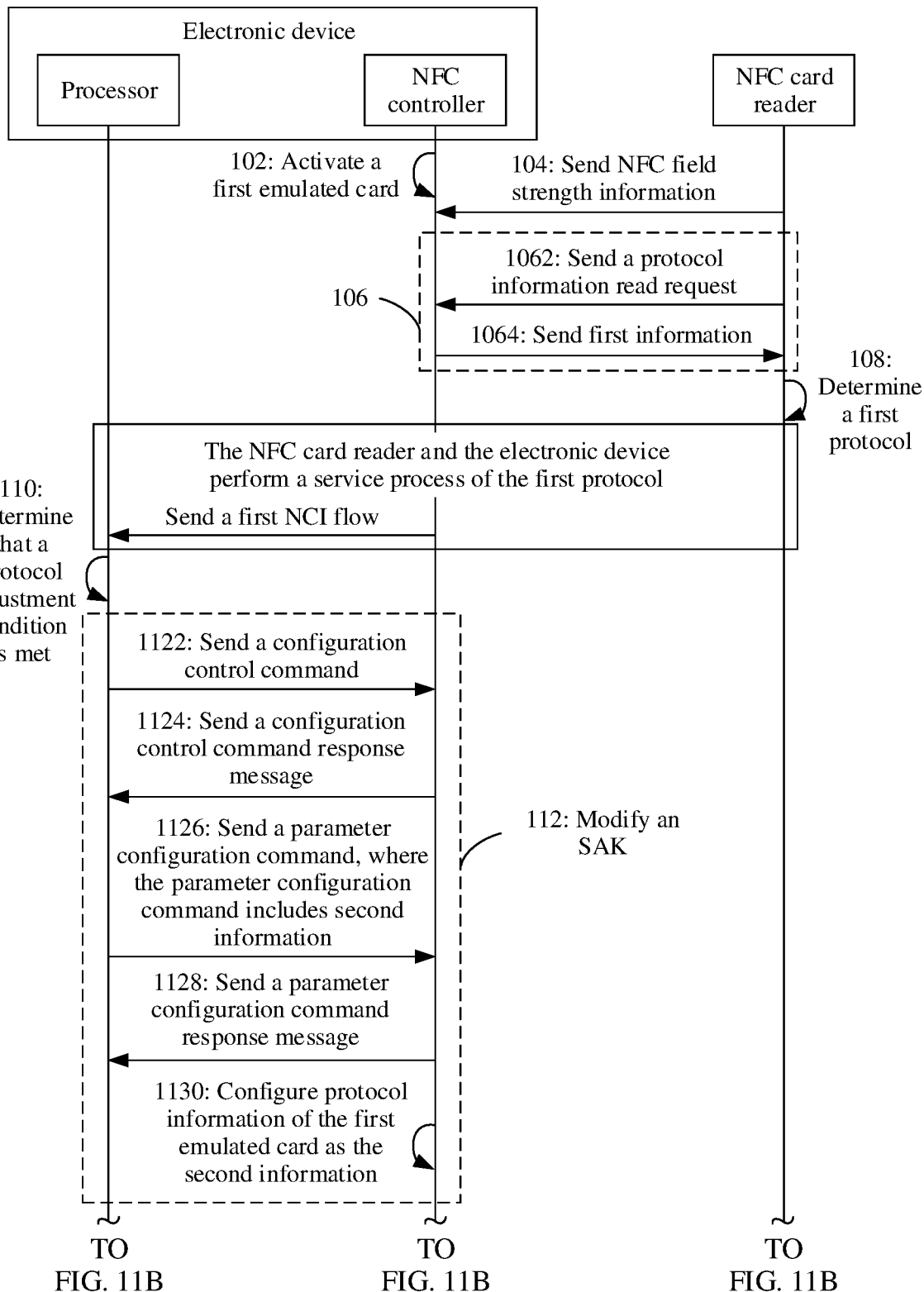
FIG. 11A to FIG. 11C are a signaling flowchart of an emulated card switching method according to some embodiments.
Figure 11B:
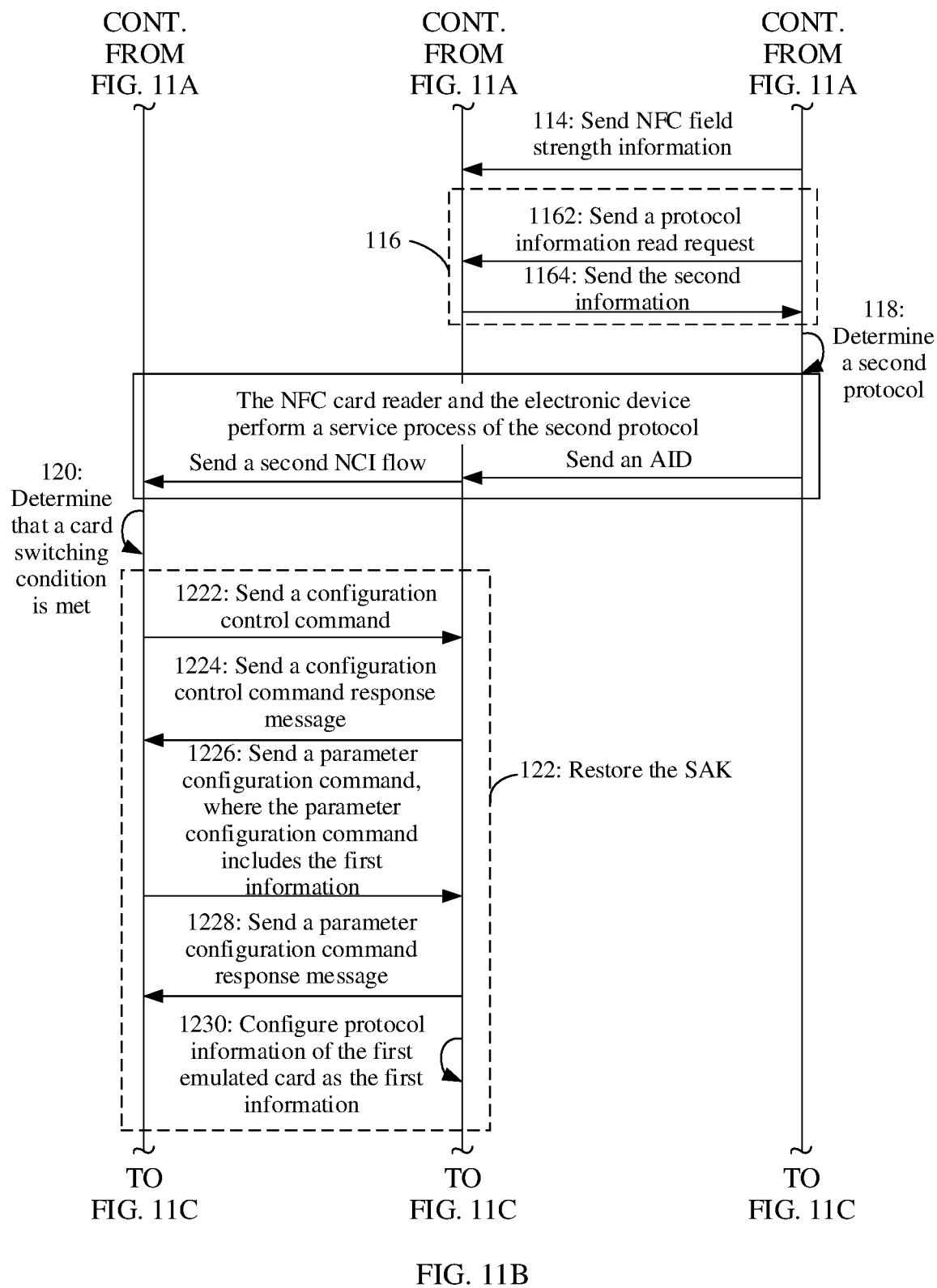
Figure 11C:
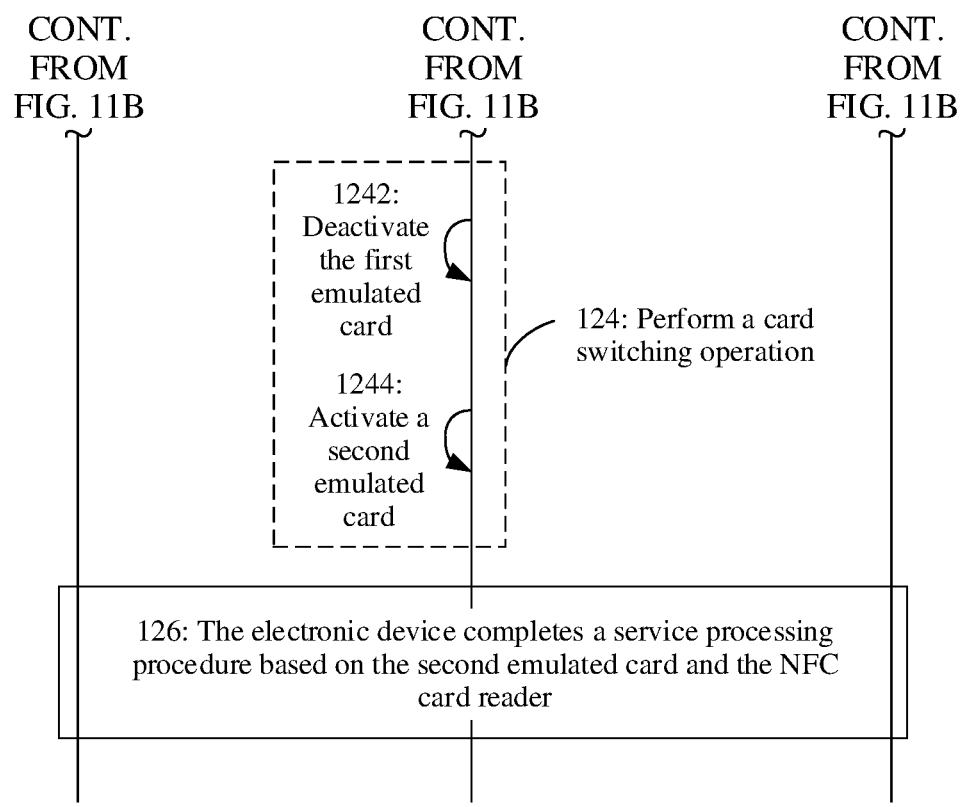

For example, the electronic device being in the screen-on state may include: A display interface of the electronic device is a home screen or an operation interface of any application. FIG. 10A and FIG. 10B are a flowchart of an emulated card switching method according to some embodiments. FIG. 11A to FIG. 11C are a signaling flowchart of an emulated card switching method according to some embodiments. As shown in FIG. 10A, FIG. 10B, and FIG. 11A to FIG. 11C, the method includes the following steps.

Step 102: The electronic device activates a first emulated card, so that the first emulated card is an activated card.

For example, the first emulated card is an access card. A user may set the access card as a default card on the electronic device, so that the access card is an activated card. Alternatively, a geo-fence is established by using an access card reader as a center. When the electronic device enters a predetermined area of the geo-fence, the access card is activated, so that the access card is an activated card.

For example, the first emulated card may alternatively be a bus card "Shenzhen Tong". The user may set the bus card "Shenzhen Tong" as the default card on the electronic device, and the bus card "Shenzhen Tong" is an activated card.

As shown in FIG. 11A to FIG. 11C, an NFC controller of the electronic device activates the first emulated card.

Step 104: The electronic device receives NFC field strength information sent by an NFC card reader.

As shown in FIG. 11A to FIG. 11C, the electronic device approaches the NFC card reader, and the NFC controller of the electronic device receives the NFC field strength information sent by the NFC card reader, indicating that the NFC controller detects an NFC radio frequency field sent by the NFC card reader. Further, the NFC controller sends field strength information receiving response information to the NFC card reader.

In this embodiment of this application, the NFC card reader exchanges information with the electronic device in a polling manner.

Step 106: The NFC card reader obtains protocol information of the first emulated card from the electronic device, where the protocol information of the first emulated card includes first information.

The protocol information of the first emulated card includes an SAK.

The first information may indicate a protocol for which no AID is selected, so that a card support protocol corresponding to the first information includes the protocol for which no AID is selected. For example, the first information includes 0x08, that is, SAK=0x08, and the first emulated card may include an access card "My home".

Alternatively, the first information may indicate a protocol for which an AID is selected, so that a card support protocol corresponding to the first information includes the protocol for which an AID is selected. For example, the first information includes 0x20 or 0x28, that is, SAK=0x20 or SAK=0x28, and the first emulated card may include the bus card "Shenzhen Tong".

The step may specifically include the following steps.

Step 1062: The NFC card reader sends a protocol information read request.

Step 1064: The electronic device sends the first information to the NFC card reader in response to the received protocol information read request.

As shown in FIG. 11A to FIG. 11C, the NFC controller of the electronic device sends the first information to the NFC card reader in response to the received protocol information read request.

Step 108: The NFC card reader determines a first protocol based on the first information and a protocol supported by the NFC card reader, and performs a service process of the first protocol with the electronic device.

Specifically, the NFC card reader determines, based on the first information, a card support protocol corresponding to the first information, then determines the first protocol based on the card support protocol corresponding to the first information and the protocol supported by the NFC card reader, and performs the service process of the first protocol with the electronic device.

Step 110: The electronic device determines, based on a first NCI flow generated when the electronic device performs the service process of the first protocol with the NFC card reader, whether a protocol information adjustment condition is met, and if the protocol information adjustment condition is met, the electronic device performs step 112; or if the protocol information adjustment condition is not met, the electronic device performs step 130.

In this step, if the electronic device determines that the protocol information adjustment condition is met, it indicates that the SAK needs to be adjusted; or if the electronic device determines that the protocol information adjustment condition is not met, it indicates that the SAK does not need to be adjusted.

In this step, if the electronic device determines that the first NCI flow does not include an AID, the electronic device determines that the protocol information adjustment condition is met; or if the electronic device determines that the first NCI flow includes an AID, the electronic device determines that the protocol information adjustment condition is not met.

In a process in which the electronic device performs the service process of the first protocol with the NFC card reader, the NFC controller may send the first NCI flow to the processor.

Figure 12:
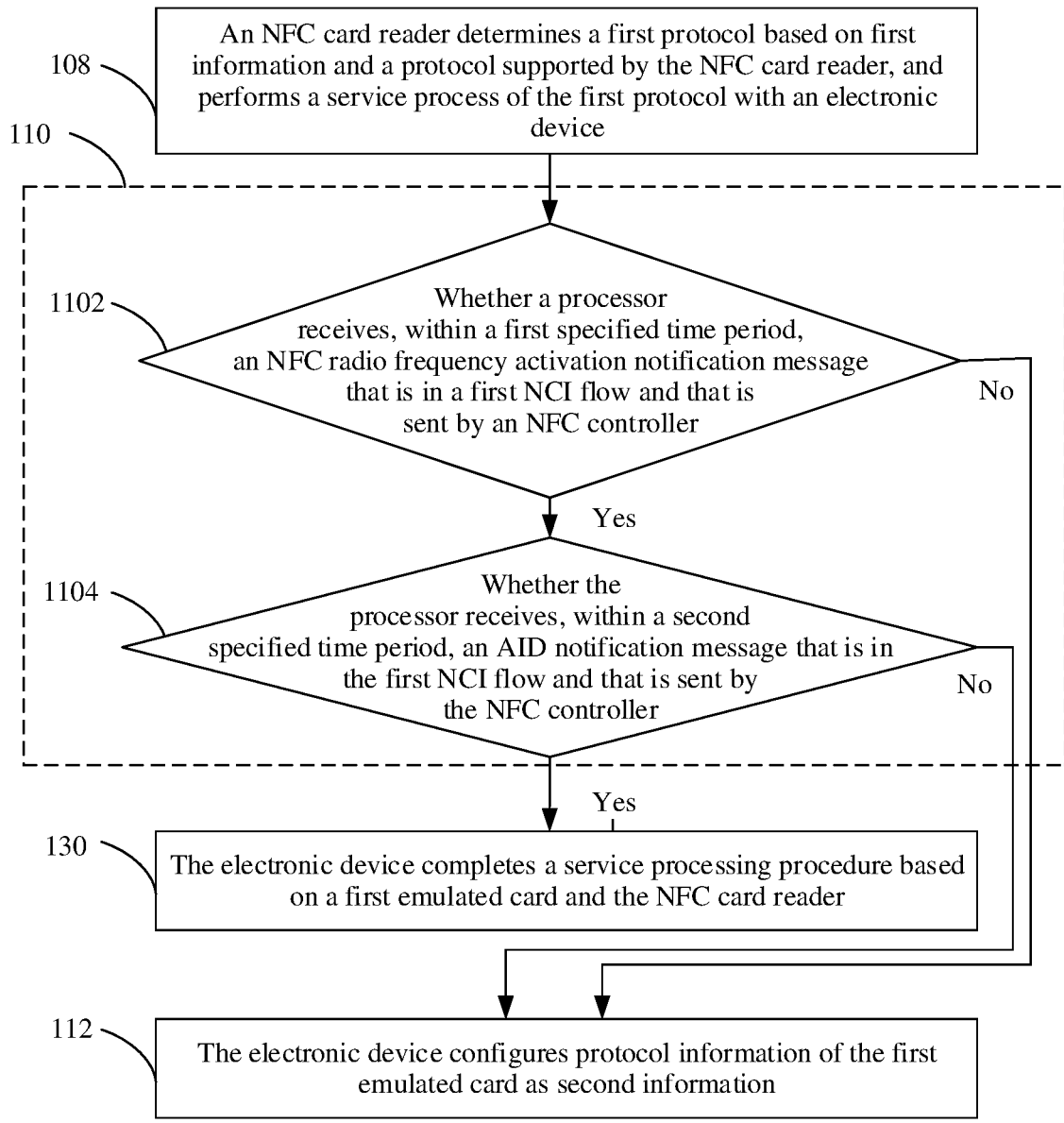
FIG. 12 is a flowchart of determining whether to adjust protocol information according to some embodiments.

As shown in FIG. 12, this step may specifically include the following steps.

Step 1102: Determine whether a processor receives, within a first specified time period, an NFC radio frequency activation notification message in the first NCI flow sent by the NFC controller. If yes, step 1104 is performed, or if no, step 112 is performed.

If the processor receives the NFC radio frequency activation notification message in the first NCI flow within the first specified time period, the processor continues to perform step 1104. If the processor does not receive the NFC radio frequency activation notification message in the first NCI flow within the first time period, the processor does not continue to wait for receiving an AID notification message in the first NCI flow, directly determines that the protocol information adjustment condition is met, and continues to perform step 112.

Step 1104: Determine whether the processor receives, within a second specified time period, the AID notification message in the first NCI flow sent by the NFC controller, where the AID notification message in the first NCI flow includes an AID. If yes, step 130 is performed, or if no, step 112 is performed.

If the processor receives the AID notification message in the first NCI flow within the second specified time period, the processor determines that the protocol adjustment condition is not met, and continues to perform step 130. If the processor does not receive the AID notification message in the first NCI flow within the second specified time period, the processor determines that the protocol adjustment condition is met, and continues to perform step 112.

Step 112: The electronic device configures the protocol information of the first emulated card as second information.

The first information may indicate a protocol for which an AID is selected, so that a card support protocol corresponding to the second information includes the protocol for which an AID is selected. For example, the second information includes 0x20 or 0x28, that is, SAK=0x20 or SAK=0x28. In this step, the electronic device modifies the SAK from 0x08 to 0x20 or 0x28.

As shown in FIG. 11A to FIG. 11C, this step may specifically include the following steps.

Step 1122: The processor sends a configuration control command (NFCC_CONFIG_CONTROL) to the NFC controller.

The configuration control command indicates an NCI 2.0 standard protocol. The configuration control command carries a specified parameter value, to instruct the NFC controller to run a host (Host) on the electronic device to configure a chip parameter.

Step 1124: The NFC controller sends a configuration control command response message to the processor.

Step 1126: The processor sends a parameter configuration command (CORE_SET_CONFIG_CMD) to the NFC controller, where the parameter configuration command includes the second information.

The parameter configuration command indicates an NCI 1.0 standard protocol. The parameter configuration command carries the second information, to instruct the NFC controller to configure the SAK as the second information.

Step 1128: The NFC controller sends a parameter configuration command response message to the processor.

Step 1130: The NFC controller configures the protocol information of the first emulated card as the second information.

The NFC controller modifies the SAK from 0x08 to 0x20 or 0x28.

Step 114: The electronic device receives NFC field strength information sent by the NFC card reader.

Step 116: The NFC card reader obtains the second information from the electronic device.

The step may specifically include the following steps.

Step 1162: The NFC card reader sends a protocol information read request to the electronic device.

Step 1164: The electronic device sends the second information to the NFC card reader in response to the received protocol information read request.

As shown in FIG. 11A to FIG. 11C, the NFC controller of the electronic device sends the second information to the NFC card reader in response to the received protocol information read request.

Step 118: The NFC card reader determines a second protocol based on the second information and the protocol supported by the NFC card reader, and performs a service process of the second protocol with the electronic device.

Specifically, the NFC card reader determines, based on the SAK, a card support protocol corresponding to the second information, determines the second protocol based on the card support protocol corresponding to the second information and the protocol supported by the NFC card reader, and performs the service process of the second protocol with the electronic device.

Step 120: The electronic device determines, based on a second NCI flow generated when the electronic device performs the service process of the second protocol with the NFC card reader, whether a card switching condition is met, and if yes, performs step 122; or if no, performs step 128.

In this step, if the electronic device determines that the card switching condition is met, it indicates that a card switching operation needs to be performed on the first emulated card. If the electronic device determines that the card switching condition is not met, it indicates that a card switching operation does not need to be performed on the first emulated card.

In this step, if the electronic device determines that the second NCI flow includes the AID, the electronic device determines that the card switching condition is met. If the electronic device determines that the second NCI flow does not include the AID, the electronic device determines that the card switching condition is not met.

In a process in which the electronic device performs the service process of the second protocol with the NFC card reader, the NFC controller may send the second NCI flow to the processor.

Figure 13:
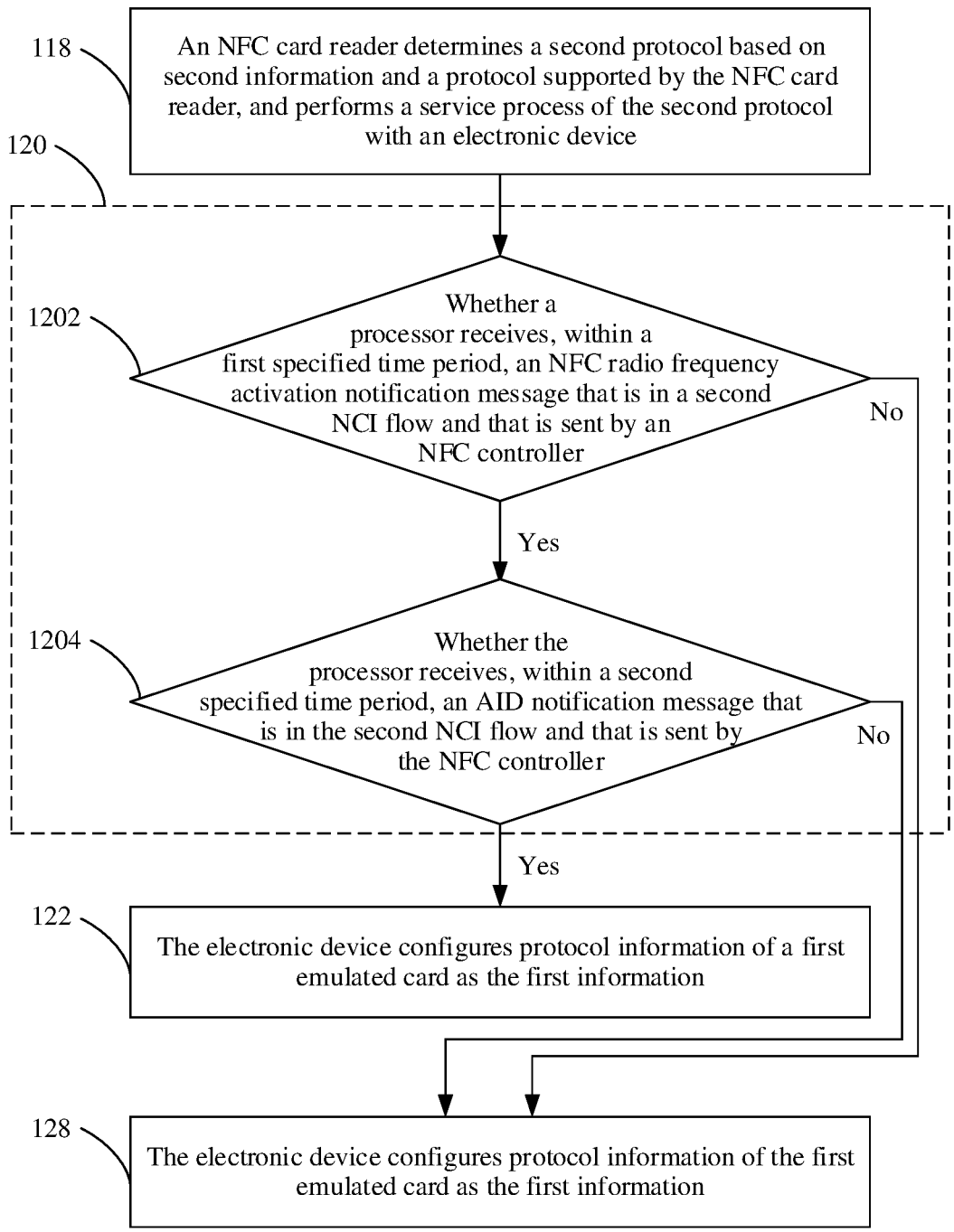
FIG. 13 is a flowchart of determining whether to switch a card according to some embodiments.

As shown in FIG. 13, this step may specifically include the following steps.

Step 1202: Determine whether a processor receives, within a first specified time period, an NFC radio frequency activation notification message in the second NCI flow sent by the NFC controller. If yes, step 1204 is performed, or if no, step 128 is performed.

If the processor receives the NFC radio frequency activation notification message in the second NCI flow within the first specified time period, the processor continues to perform step 1204. If the processor does not receive the NFC radio frequency activation notification message in the second NCI flow within the first time period, the processor does not continue to wait for receiving an AID notification message in the second NCI flow, directly determines that the card switching condition is not met, and continues to perform step 128.

Step 1204: Determine whether the processor receives, within a second specified time period, the AID notification message in the second NCI flow sent by the NFC controller, where the AID notification message in the second NCI flow includes an AID. If no, step 128 is performed, or if yes, step 122 is performed.

If the processor receives the AID notification message in the second NCI flow within the second specified time period, the processor determines that the card switching condition is met, and continues to perform step 122. If the processor does not receive the AID notification message in the second NCI flow within the second specified time period, the processor determines that the card switching condition is not met, and continues to perform step 128.

Step 122: The electronic device configures the protocol information of the first emulated card as the first information.

In this step, the electronic device modifies the SAK from 0x20 or 0x28 to 0x08, to restore the SAK to 0x08.

As shown in FIG. 11A to FIG. 11C, this step may specifically include the following steps.

Step 1222: The processor sends a configuration control command to the NFC controller.

Step 1224: The NFC controller sends a configuration control command response message to the processor.

Step 1226: The processor sends a parameter configuration command to the NFC controller, where the parameter configuration command includes the first information.

Step 1228: The NFC controller sends a parameter configuration command response message to the processor.

Step 1230: The NFC controller configures the protocol information of the first emulated card as the first information.

The NFC controller restores the SAK from 0x20 or 0x28 to 0x08.

Step 124: The electronic device switches, based on the AID in the second NCI flow, the first emulated card to the second emulated card corresponding to the AID in the second NCI flow.

In this embodiment of this application, the second NCI flow may include one or more AIDs.

If the second NCI flow includes one AID, the electronic device may switch, based on the AID, the first emulated card to the second emulated card corresponding to the AID.

If the second NCI stream includes a plurality of AIDs, the electronic device may determine one AID in the plurality of AIDs, and switch, based on the determined AID, the first emulated card to the second emulated card corresponding to the determined AID. For example, when an emulated card is a bus card, one AID may be determined based on a user preference, a card balance, or a set rule. For example, the set rule is that a local bus card is preferentially selected.

For example, if the determined AID is A000000632010105, the second emulated card corresponding to the AID is a Shenzhen Tong interconnection card. The electronic device switches the access card "My home" to the Shenzhen Tong interconnection card.

Figure 14:
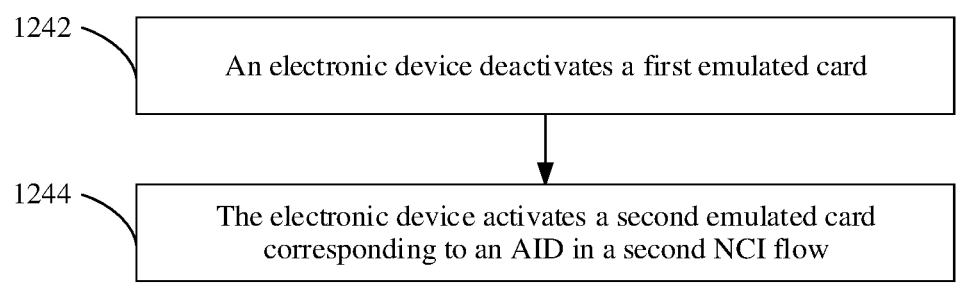
FIG. 14 is a flowchart of switching a module card according to some embodiments.

As shown in FIG. 14, this step may specifically include the following steps.

Step 1242: The electronic device deactivates the first emulated card.

As shown in FIG. 11A to FIG. 11C, the NFC controller deactivates the first emulated card.

Step 1244: The electronic device activates the second emulated card corresponding to the AID in the second NCI flow.

As shown in FIG. 11A to FIG. 11C, the NFC controller activates the second emulated card corresponding to the AID in the second NCI flow.

Step 126: The electronic device completes a service processing procedure based on the second emulated card and the NFC card reader.

Step 128: The electronic device configures the protocol information of the first emulated card as the first information.

As shown in FIG. 11A to FIG. 11C, this step may specifically include the following steps.

Step 1282: The processor sends a configuration control command to the NFC controller.

Step 1284: The NFC controller sends a configuration control command response message to the processor.

Step 1286: The processor sends a parameter configuration command to the NFC controller, where the parameter configuration command includes the first protocol message.

Step 1288: The NFC controller sends a parameter configuration command response message to the processor.

Step 1230: The NFC controller configures the protocol information of the first emulated card as the first information.

Step 130: The electronic device completes a service processing procedure based on the first emulated card and the NFC card reader.

In an optional solution, if the first emulated card is the access card "My home", and the NFC card reader is a card reader of a community access system, in step 130 performed after step 128, the electronic device completes a service processing procedure based on the access card "My home" and the card reader of the community access system.

In another optional solution, if the first emulated card is the bus card "Shenzhen Tong", and the NFC card reader is a card reader of a Shenzhen bus turnstile, in step 130 performed after step 110, the electronic device completes a service processing procedure based on the bus card "Shenzhen Tong" and the card reader of the Shenzhen bus turnstile.

In this embodiment of this application, the electronic device is further configured to display prompt information. The prompt information is used to prompt the user that card swiping succeeds or fails. For example, the prompt information may include a prompt tone or a text prompt.

In this embodiment of this application, the electronic device is further configured to display, in response to a first operation entered by the user, the second emulated card as the default card. The first operation may include tapping an icon of a wallet application, and the electronic device enters a page of the wallet application in response to the first operation. The page may display the default card. For example, the default card may include the first emulated card or the second emulated card.

For example, the electronic device does not perform an emulated card switching process, that is, when the first emulated card is the activated card, if the user enters the first operation on the electronic device, the electronic device may display the first emulated card as the default card, for example, display the access card "My home" as the default card.

For example, after step 126 and step 130, because the electronic device switches the first emulated card to the second emulated card, when the user enters the first operation on the electronic device, the electronic device may display the second emulated card as the default card, for example, display the bus card "Shenzhen Tong" as the default card. Alternatively, after the electronic device switches the first emulated card to the second emulated card and completes a card swiping process based on the second emulated card, when the user enters the first operation on the electronic device, the electronic device may display the first emulated card as the default card, for example, display the access card "My home" as the default card. In this case, the electronic device restores the default card to the first emulated card.

It should be noted that the SAK, the AID, and the protocol are all examples of embodiments of this application, and the SAK, the AID, and the protocol may be other content. This is not limited in embodiments of this application.

In the technical solutions of the emulated card switching method provided in this embodiment of this application, the electronic device adjusts protocol information of an activated card (the first emulated card), so that the NFC card reader can perform a service process of a specified protocol with the electronic device based on adjusted protocol information and the protocol supported by the NFC card reader. When performing the service process of the protocol, the electronic device obtains an AID and automatically switches the first emulated card to the second emulated card corresponding to the AID based on the AID. In this way, automatic card switching is implemented, and card swiping efficiency is improved.

The following describes in detail the technical solutions of embodiments of this application by comparing with an automatic card switching method in a related technology and by using an example in which an electronic device includes a mobile phone and an NFC card reader includes a bus turnstile.

As shown in (a) in FIG. 15, a user performs a card swiping operation on the bus turnstile by using the mobile phone. An activated card of the mobile phone is an access card. When the mobile phone approaches the bus turnstile, the bus turnstile reads SAK from the mobile phone. In this case, the SAK is 0x08, and a card support protocol corresponding to the SAK is the ISO14443-3 protocol for which no AID is selected. The bus turnstile and mobile phone perform a service process of the ISO14443-3 protocol. When performing the service process of the ISO14443-3 protocol, the bus turnstile does not return an AID to the mobile phone. The mobile phone cannot perform card switching based on the AID. The current activated card is still the access card, and the access card is displayed. The user views the displayed access card on the mobile phone, and enters a card switching operation into the mobile phone. For example, the card switching operation includes tapping a bus card "Shenzhen Tong" (as shown in FIG. 5(b)), and switching the access card to the bus card "Shenzhen Tong". The mobile phone completes a card swiping transaction on the bus turnstile through the bus card "Shenzhen Tong". That is, card swiping succeeds.

As shown in (b) in FIG. 15, a user performs a card swiping operation on the bus turnstile by using the mobile phone. An activated card of the mobile phone is an access card. When the mobile phone approaches the bus turnstile, the bus turnstile reads SAK from the mobile phone. In this case, the SAK is 0x08, and a card support protocol corresponding to the SAK is the ISO14443-3 protocol for which no AID is selected. The bus turnstile and the mobile phone perform a service process of the ISO14443-3 protocol. When performing the service process of the ISO14443-3 protocol, the bus turnstile does not return an AID to the mobile phone. The mobile phone modifies the SAK to 0x20, and the bus turnstile reads the SAK from the mobile phone. In this case, the SAK is 0x20, and a card support protocol corresponding to the SAK includes the ISO14443-3 protocol for which no AID is selected and the ISO14443-4 protocol for which an AID is selected. The bus turnstile and mobile phone perform service processes of the ISO14443-3 protocol and the ISO14443-4 protocol. When performing the service process of the ISO14443-4 protocol, the bus turnstile returns the AID to the mobile phone. The mobile phone automatically switches the access card to the bus card "Shenzhen Tong" corresponding to the AID based on the AID. The mobile phone completes a card swiping transaction on the bus turnstile through the bus card "Shenzhen Tong". That is, card swiping succeeds.

As shown in (a) and (b) in FIG. 15, in the solutions of the related technology, the access card needs to be manually switched to the bus card "Shenzhen Tong". However, in the solutions of this embodiment of this application, the access card can be automatically switched to the bus card "Shenzhen Tong". In this way, automatic card switching is implemented, and card swiping efficiency is improved.

In the related technology, the emulated card may be switched based on the AID. If the activated card is a default card and an NFC card reader is a card reader of a community access system, the default card needs to be switched to a target card.

A protocol supported by the card reader of the community access system includes a protocol for which no AID is selected, and a card support protocol corresponding to the access card includes a protocol for which no AID is selected. Therefore, the access card does not have a corresponding AID. When the user performs a card swiping operation on the card reader of the community access system by using the electronic device, the electronic device needs to wait for a preset period of time blindly, and determines, within the preset period of time, whether an AID sent by the card reader of the community access system is obtained. If no AID is obtained, it is determined, by using an exclusion method, that the target card is the access card, that is, an emulated card to be swiped on the card reader of the community access system is the access card, and then the default card is switched to the access card, to implement smart swiping of the access card. During card swiping, the electronic device needs to enter a field strength of the NFC card reader, and needs to wait for the preset period of time blindly. Consequently, emulated card switching is slow, and a card swiping speed is slow, thereby reducing card swiping efficiency.

When the user performs a card swiping operation on the card reader of the community access system by using the electronic device, after the card reader of the community access system reads the default card preset on the electronic device, even a wallet application on the electronic device immediately completes automatic card switching to switch the default card to the target card, the card reader of the community access system does not read the card again. This causes a card swiping failure. In this case, the user needs to remove the electronic device from the card reader of the community access system, and then places the electronic device close to the card reader of the community access system again to successfully swipe the card. This exception is caused by behavior of the card reader of the community access system, and is also a side effect caused by a case in which an emulated card switching operation can be performed only within the field strength of the card reader of the community access system during card swiping. In this way, emulated card switching is slow, and card swiping is slow, thereby reducing card swiping efficiency.

In a solution in which the access card is selected by using the exclusion method, only one access card can be selected. In this case, if a plurality of access cards are disposed on the electronic device, and the selected access card cannot be swiped, the user needs to switch the selected access card to a correct access card. In this way, emulated card switching is slow, and card swiping is slow, thereby reducing card swiping efficiency.

To resolve the foregoing technical problem, some other embodiments of this application further provide an emulated card switching method. In this embodiment of this application, when entering a predetermined area, an electronic device collects a current location fingerprint, and calculates a similarity between the current location fingerprint and a pre-collected card swiping point fingerprint. If the similarity is greater than a threshold, an activated card is switched to an emulated card that matches the card swiping point fingerprint. In this application, it may be determined, based on a change of the similarity, whether the electronic device is close to the card swiping point or far away from the card swiping point, to determine whether to switch to the simulated card that matches the card swiping point fingerprint. In this embodiment of this application, if it is determined that the electronic device is close to the card swiping point, card pre-switching is implemented. When a user moves to the card swiping point, the electronic device may directly complete a card swiping process with an NFC card reader, thereby improving card swiping efficiency.

FIG. 16 is a flowchart of an emulated card switching method according to some other embodiments of this application. As shown in FIG. 16, the method includes the following steps.

Step 202: An electronic device collects a card swiping point fingerprint at a card swiping point, and establishes a correspondence between the card swiping point fingerprint and a target card.

An NFC card reader is disposed at the card swiping point. For example, the NFC card reader is a card reader of a community access system.

When a user performs card swiping at the card swiping point for the first time by using the electronic device, the electronic device collects a feature of a surrounding network device of the card swiping point, and uses the feature of the peripheral network device of the card swiping point as the card swiping point fingerprint. The card swiping point fingerprint includes an ID of the peripheral network device and a signal parameter corresponding to the ID.

The collected card swiping point fingerprint includes but is not limited to the following types of card swiping point fingerprints.

(1) If a surrounding network is a Wi-Fi network, the ID of the surrounding network device includes a BSSID, and the corresponding signal parameter includes an RSSI, the collected card swiping point fingerprint includes a BSSID and an RSSI of the Wi-Fi network, and each BSSID corresponds to one RSSI. Usually, there are a plurality of Wi-Fi network devices around the card swiping point. In this case, a plurality of card swiping point fingerprints may be collected, that is, a plurality of fingerprints groups of BSSIDs and corresponding RSSIs are collected.

(2) If a surrounding network is a BT network or a BLE network, the ID of the surrounding network device includes a BSSID, and the corresponding signal parameter includes an RSSI, the collected card swiping point fingerprint includes a BSSID and an RSSI of the BT network or the BLE network, and each BSSID corresponds to one RSSI. Usually, there are a plurality of BT networks or BLE networks around the card swiping point. In this case, a plurality of card swiping point fingerprints may be collected, that is, a plurality of fingerprints groups of BSSIDs and corresponding RSSIs are collected.

(3) If the surrounding network device is a cell base station, the ID of the surrounding network device includes a CID, and the corresponding signal parameter includes a signal value dBm, the collected card swiping point fingerprint includes a CID and a signal value dBm of the cell base station, and each CID corresponds to one signal value dBm. Usually, there are a plurality of cell base stations around the card swiping point. In this case, a plurality of card swiping point fingerprints can be collected. That is, a plurality of groups of CIDs and corresponding signal values dBm are collected.

In this step, in a process of establishing the correspondence between the card swiping point fingerprint and the target card, the target card is an emulated card used to perform a card swiping operation on the NFC card reader at the card swiping point.

Step 204: If the electronic device enters a specific area, the electronic device collects a current location fingerprint.

In this embodiment of this application, after entering the specific area, the electronic device may scan a surrounding network in a screen-off scanning manner, to collect the current location fingerprint.

In this embodiment of this application, the card swiping point may be used as a center point to establish a geo-fence, and an area covered by the geo-fence is the specific area. After the electronic device is ready to enter the geo-fence, the electronic device starts to periodically collect the current location fingerprint. After the electronic device leaves the geo-fence, the electronic device stops collecting the current location fingerprint.

When the electronic device moves in the electronic fence, the electronic device periodically collects a feature of a surrounding network device at the current location, and uses the feature of the surrounding network device at the current location as a current location fingerprint. The current location fingerprint includes an ID of the surrounding network device and a signal parameter corresponding to the ID.

The collected current location fingerprint includes but is not limited to the following types of card swiping point fingerprints.

(1) If a surrounding network is a Wi-Fi network, the ID of the surrounding network device includes a BSSID, and the corresponding signal parameter includes an RSSI, the collected current location fingerprint includes a BSSID and an RSSI of the Wi-Fi network, and each BSSID corresponds to one RSSI. Usually, there are a plurality of Wi-Fi network devices around the card swiping point. In this case, a plurality of card swiping point fingerprints may be collected, that is, a plurality of fingerprints groups of BSSIDs and corresponding RSSIs are collected.

(2) If a surrounding network is a BT network or a BLE network, the ID of the surrounding network device includes a BSSID, and the corresponding signal parameter includes an RSSI, the collected current location fingerprint includes a BSSID and an RSSI of the BT network or the BLE network, and each BSSID corresponds to one RSSI. Usually, there are a plurality of BT networks or BLE networks around the card swiping point. In this case, a plurality of card swiping point fingerprints may be collected, that is, a plurality of fingerprints groups of BSSIDs and corresponding RSSIs are collected.

(3) If the surrounding network device is a cell base station, the ID of the surrounding network device includes a CID, and the corresponding signal parameter includes a signal value dBm, the collected current location fingerprint includes a CID and a signal value dBm of the cell base station, and each CID corresponds to one signal value dBm. Usually, there are a plurality of cell base stations around the card swiping point. In this case, a plurality of card swiping point fingerprints can be collected. That is, a plurality of groups of CIDs and corresponding signal values dBm are collected.

When the electronic device moves in the electronic fence, the current location fingerprint collected periodically (that is, at an interval) constantly changes.

Step 206: The electronic device calculates a similarity between the current location fingerprint and the card swiping point fingerprint. As the user moves, the current location fingerprint collected at an interval constantly changes, and therefore the similarity obtained through calculation also constantly changes.

The card swiping point fingerprint is marked as F1 and the current location fingerprint is marked as F2.

The step may specifically include the following steps.

Step 2062: Find a same ID in the card swiping point fingerprint F1 and the current location fingerprint F2, and form a same device set [ID1, ID2, . . . , IDn] based on the same ID, where a quantity of same IDs in F1 and F2 is n.

Step 2064: Form a first signal parameter set [Q1, Q2, . . . , Qn] of F1 based on signal parameters that are in F1 and that correspond to IDs in the same device set, and form a second signal parameter set [Q1', Q2', . . . , Qn'] of F2 based on signal parameters that are in F2 and that correspond to IDs in the same device set.

Step 2066: Calculate the similarity.

In an optional solution, the similarity is calculated based on a quantity n of elements in the same device set and a quantity m of IDs in the card swiping point fingerprint F1, where n≤m. For example, the similarity $S=1/(m-n+1)$. If values of n and m are closer to each other, the calculated similarity is greater.

In another optional solution, the similarity is calculated based on a first signal parameter set and a second signal parameter set. For example, the similarity $S=1/(d+1)$, where d may be a Euclidean distance between a first signal parameter set $[Q1, Q2, \ldots, Qn]$ and a second signal parameter set $[Q1', Q2', \ldots, Qn']$, and d may be obtained by performing calculation on $[Q1, Q2, \ldots, Qn]$ and $[Q1', Q2', \ldots, Qn']$ by using a Euclidean distance formula. A smaller value of d indicates a greater calculated similarity.

In another optional solution, the similarity is calculated based on the quantity n of elements in the same device set, the quantity m of IDs in the card swiping point fingerprint F1, the first signal parameter set, and the second signal parameter set. For example, the similarity is $S=k1/(m-n+1)+k2/(d+1)$, where k1 and k2 are weight coefficients, and $k1+k2=1$.

A value of the similarity calculated in this step is greater than 0 and less than or equal to 1.

Step 208: Performing emulated card switching based on the similarity.

The similarity indicates a degree of proximity between the current location and the card swiping point. A larger similarity indicates that the electronic device is closer to the card swiping point, and a smaller similarity indicates that the electronic device is farther away from the card swiping point.

If it is determined that the similarity is greater than or equal to a threshold, it indicates that the electronic device is very close to the card swiping point, and the activated card is switched, based on the established correspondence between the card swiping point fingerprint and the target card, to the target card that matches the card swiping point fingerprint. For example, the activated card is the bus card "Shenzhen Tong", and the target card is the access card. Then, when the user moves to the card swiping point, because the electronic device has completed a card switching process in advance, a swiping operation of the access card may be directly performed on the NFC card reader at the card swiping point. In this way, a card swiping speed is improved, and card swiping efficiency is improved.

If it is determined that the similarity is less than the threshold, it indicates that the electronic device is far away from the card swiping point, and the activated card is switched to the default card based on the established correspondence between the card swiping point fingerprint and the target card. For example, the activated card is the access card, and the default card is the bus card "Shenzhen Tong".

In the technical solutions provided in this embodiment, the electronic device collects the card swiping point fingerprint at the card swiping point and establishes the correspondence between the card swiping point fingerprint and the target card. If the electronic device enters the specific area, the electronic device collects the current location fingerprint, calculates the similarity between the current location fingerprint and the card swiping point fingerprint, and performs emulated card switching based on the similarity. In this way, a card pre-switching operation is automatically performed based on the similarity, so that a problem that card swiping is performed twice and card swiping is slow because card switching is performed only when the electronic device is close to the NFC reader is resolved, thereby improving card swiping efficiency. In the solutions in this embodiment of this application, because the card pre-switching operation is automatically performed based on the similarity, automatic card pre-switching is implemented when a plurality of access cards are disposed on the electronic device, and the user does not need to manually perform card switching, thereby improving card swiping efficiency.

An embodiment of this application provides an electronic device. The electronic device may be a terminal device, or may be a circuit device built into the terminal device. The electronic device includes a display, one or more processors, a memory, and one or more computer programs. The one or more computer programs are stored in the memory, the one or more computer programs include instructions, and when the instructions are executed by the device, the device is enabled to perform the steps in the foregoing embodiment of the emulated card switching method.

An embodiment of this application provides a computer-readable storage medium. The computer-readable storage medium stores instructions, and when the instructions are run on a computer, the computer is enabled to perform the steps in the foregoing embodiment of the emulated card switching method.

An embodiment of this application provides a computer program product including instructions. When the computer program product runs on a computer or any one of at least one processor, the computer is enabled to perform the steps in the foregoing emulated card switching method embodiments.

In embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. "At least one of the following items" and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In embodiments of this application, when any of the functions is implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. An emulated card switching method, comprising:
sending first information of a first emulated card to a near field communication (NFC) card reader, wherein the NFC card reader determines a first protocol based on first information and a protocol supported by the NFC card reader, wherein the NFC card reader performs a service process of the first protocol with an electronic device, wherein the first emulated card is disposed on the electronic device, wherein the first emulated card is an activated card, and wherein the first protocol is a card support protocol of the first emulated card;
modifying, based on no identification information being obtained from the service process of the first protocol being performed with the NFC card reader, protocol information of the first emulated card from the first information to second information;
sending the second information to the NFC card reader, wherein the NFC card reader obtains the second information from the electronic device, determines a second protocol based on the second information and the protocol supported by the NFC card reader, and performs a service process of the second protocol with the electronic device, wherein the second protocol is a card support protocol of a second emulated card, and wherein the second emulated card is further disposed on the electronic device; and
switching, based on identification information being obtained from the service process of the second protocol being performed with the NFC card reader, the first emulated card to the second emulated card corresponding to the identification information.

2. The method according to claim 1, wherein performing the service process of the first protocol comprises:
performing, based on the first protocol comprising a protocol for which no identification information is selected, a service process of the protocol for which no identification information is selected.

3. The method according to claim 1, wherein the first protocol comprises the ISO14443-3 protocol, and wherein the second protocol comprises both the ISO14443-3 protocol and the ISO14443-4 protocol.

4. The method according to claim 1, wherein the identification information comprises an application identifier (AID).

5. The method according to claim 1, wherein the protocol information of the first emulated card is a select acknowledge (SAK).

6. The method according to claim 1, wherein the method further comprises:
displaying, in response to a first operation entered by a user, the second emulated card as a default card.

7. The method according to claim 1, wherein the method further comprises:
displaying prompt information, wherein the prompt information prompts a user that card swiping succeeds or fails.

8. The method according to claim 1, wherein the first emulated card is an access card, and the second emulated card is a bus card.

9. An electronic device, comprising:
a processor;
a near field communication (NFC) controller; and
a first emulated card and a second emulated card disposed on the electronic device, wherein the first emulated card is an activated card, a card support protocol of the first emulated card is a first protocol, and a card support protocol of the second emulated card is a second protocol;
wherein the NFC controller is configured to send first information of the first emulated card to an NFC card reader, wherein the NFC card reader determines the first protocol based on the first information and a protocol supported by the NFC card reader, and performs a service process of the first protocol with the electronic device;
wherein the NFC controller is further configured to send, to the processor, first service information generated when the NFC card reader performs the service process of the first protocol with the electronic device;
wherein the processor is configured to exchange information with the NFC controller based on the first service information comprising no identification information, and wherein the NFC controller modifies protocol information of the first emulated card from the first information to second information;
wherein the NFC controller is further configured to send the second information to the NFC card reader, wherein the NFC card reader obtains the second information from the electronic device, determines the second protocol based on the second information and the protocol supported by the NFC card reader, and performs a service process of the second protocol with the electronic device;
wherein the NFC controller is further configured to send, to the processor, second service information generated when the NFC card reader performs the service process of the second protocol with the electronic device;
wherein the processor is further configured to trigger the NFC controller based on the second service information comprising the identification information; and
wherein the NFC controller is further configured to switch, based on the identification information, the first emulated card to the second emulated card corresponding to the identification information.

10. An electronic device, comprising:
a display;
one or more processors;
a non-transitory computer-readable storage medium storing one or more programs to be executed by the processor, the one or more programs including instructions for:
sending first information of a first emulated card to a near field communication (NFC) card reader, wherein the NFC card reader determines a first protocol based on first information and a protocol supported by the NFC card reader, and performs a service process of the first protocol with the electronic device, wherein the first protocol is a card support protocol of the first emulated card;
modifying, based on no identification information being obtained from the service process of the first protocol being performed with the NFC card reader, protocol information of the first emulated card from the first information to second information;
sending the second information to the NFC card reader, wherein the NFC card reader obtains the second information from the electronic device, determines a second protocol based on the second information and the protocol supported by the NFC card reader, and performs a service process of the second protocol with the electronic device wherein the second protocol is a card support protocol of a second emulated card; and
switching, based on identification information being obtained from the service process of the second protocol being performed with the NFC card reader, the first emulated card to the second emulated card corresponding to the identification information.

11. The electronic device according to claim 10, wherein when the instructions further include instructions for:
performing, based on the first protocol including a protocol for which no identification information is selected, a service process of the protocol for which no identification information is selected.

12. The electronic device according to claim 10, wherein the instructions further include instructions for:
performing, based on the second protocol including a protocol for which no identification information is selected and a protocol for which identification information is selected, a service process of the protocol for which no identification information is selected and a service process of the protocol for which the identification information is selected.

13. The electronic device according to claim 10, wherein the first protocol comprises the ISO14443-3 protocol, and wherein the second protocol comprises both the ISO14443-3 protocol and the ISO14443-4 protocol.

14. The electronic device according to claim 10, wherein the identification information comprises an application identifier (AID).

15. The electronic device according to claim 10, wherein the protocol information of the first emulated card comprises a select acknowledge (SAK).

16. The electronic device according to claim 10, wherein the instructions further include instructions for:
displaying, in response to a first operation entered by a user, the second emulated card as a default card.

17. The electronic device according to claim 10, wherein the instructions further include instructions for:
displaying prompt information, wherein the prompt information prompts a user that card swiping succeeds or fails.

18. The electronic device according to claim 10, wherein the first emulated card is an access card, and the second emulated card is a bus card.

19. A communication system, comprising:
a near field communication (NFC) card reader; and
an electronic device having an NFC function, wherein a first emulated card and a second emulated card are disposed on the electronic device, the first emulated card is an activated card, a card support protocol of the first emulated card is a first protocol, and a card support protocol of the second emulated card is a second protocol;
wherein the NFC card reader is configured to obtain first information of the first emulated card from the electronic device, determine the first protocol based on the first information and a protocol supported by the NFC card reader, and perform a service process of the first protocol with the electronic device;
wherein the electronic device is configured to modify, based on no identification information being obtained from the service process of the first protocol being performed, protocol information of the first emulated card from the first information to second information;
wherein the NFC card reader is further configured to obtain the second information from the electronic device, determine the second protocol based on a card support protocol corresponding to the second information and the protocol supported by the NFC card reader, and perform a service process of the second protocol with the electronic device; and
wherein the electronic device is further configured to stitch, based on identification information obtained from the service process of the second protocol being performed, the first emulated card to the second emulated card corresponding to the identification information.

* * * * *